(12) United States Patent
Tournes et al.

(10) Patent No.: US 8,436,283 B1
(45) Date of Patent: May 7, 2013

(54) SYSTEM AND METHOD FOR GUIDING AND CONTROLLING A MISSILE USING HIGH ORDER SLIDING MODE CONTROL

(75) Inventors: Christian Tournes, Madison, AL (US); Yuri Shtessel, Owens Cross Roads, AL (US)

(73) Assignee: Davidson Technologies Inc., Huntsville, AL (US)

( * ) Notice: Subject to any disclaimer, the term of this patent is extended or adjusted under 35 U.S.C. 154(b) by 886 days.

(21) Appl. No.: 12/501,395

(22) Filed: Jul. 10, 2009

Related U.S. Application Data

(60) Provisional application No. 61/129,676, filed on Jul. 11, 2008.

(51) Int. Cl.
*F41G 7/22* (2006.01)
*F42B 15/01* (2006.01)
*F41G 7/00* (2006.01)
*F42B 15/00* (2006.01)

(52) U.S. Cl.
USPC ......... 244/3.15; 244/3.1; 244/3.16; 244/3.21; 244/3.22; 701/1; 701/3; 701/4; 701/11

(58) Field of Classification Search .......... 701/1, 3, 701/4, 11, 12; 244/3.1–3.3; 89/1.11; 382/100, 382/103; 342/61, 62
See application file for complete search history.

(56) References Cited

U.S. PATENT DOCUMENTS

| | | | | |
|---|---|---|---|---|
| 3,323,757 A | * | 6/1967 | Cole | 244/3.16 |
| 3,946,968 A | * | 3/1976 | Stallard | 244/3.21 |
| 4,033,525 A | * | 7/1977 | Leonard et al. | 244/3.15 |
| 4,044,237 A | * | 8/1977 | Cowgill et al. | 701/3 |
| 4,054,254 A | * | 10/1977 | Cole | 244/3.21 |
| 4,142,695 A | * | 3/1979 | Remmell et al. | 244/3.14 |
| 4,198,015 A | * | 4/1980 | Yates et al. | 244/3.15 |
| 4,277,038 A | * | 7/1981 | Yates et al. | 244/3.15 |
| 4,383,662 A | * | 5/1983 | Alongi et al. | 244/3.15 |
| 4,470,562 A | * | 9/1984 | Hall et al. | 244/3.2 |
| 4,530,476 A | * | 7/1985 | Thurber et al. | 244/3.21 |
| 4,589,610 A | * | 5/1986 | Schmidt | 244/3.19 |
| 4,643,373 A | * | 2/1987 | Adams | 244/3.19 |
| 4,883,239 A | * | 11/1989 | Lachmann et al. | 244/3.15 |

(Continued)

OTHER PUBLICATIONS

M. Idan., T. Shime., and O.M. Golan., "Integrated Sliding Mode Autopilot Guidance for Dual-Control Missiles," *AIAA Journal of Guidance Control and Dynamics*, vol. 30, No. 4 Jul. Aug. 2007 issue, pp. 1081-1089.

(Continued)

*Primary Examiner* — Bernarr Gregory
(74) *Attorney, Agent, or Firm* — James Richards

(57) ABSTRACT

Higher Order Sliding Mode (HOSM) control techniques are applied to the Guidance Control (G&C) of interceptor missile in which velocity may be steered by combination of main thrust, aerodynamic lift and lateral on-off divert thrusters, and attitude may be steered by continuous or on-off actuators. Methods include the pointing of the seeker, its associated estimation processes, a guidance law that uses concurrent divert mechanisms, and an attitude autopilot. The insensitivity of the controller to matched disturbances allows the concurrent usage of the divert mechanisms without adverse effect on the accuracy. The controller also allows the de-coupling of the control of roll, pitch and yaw channels, and usage quaternions to represent body attitude and it provides control perfect robustness. While it conceivable to design separately the components of the G&C method, it is widely accepted that designing them in an integrated fashion usually produces a better result.

42 Claims, 18 Drawing Sheets

U.S. PATENT DOCUMENTS

| | | | | |
|---|---|---|---|---|
| 5,058,836 A * | 10/1991 | Nobel | 244/3.15 |
| 5,062,583 A * | 11/1991 | Lipps et al. | 244/3.15 |
| 5,064,141 A * | 11/1991 | Nesline, Jr. | 244/3.15 |
| 5,094,406 A * | 3/1992 | Shafer | 244/3.21 |
| 5,102,072 A * | 4/1992 | Egan et al. | 244/3.21 |
| 5,248,114 A * | 9/1993 | Ankeney | 244/3.15 |
| 5,435,503 A * | 7/1995 | Johnson et al. | 244/3.15 |
| 5,544,843 A * | 8/1996 | Johnson | 244/3.11 |
| 5,590,850 A * | 1/1997 | Cannon et al. | 244/3.15 |
| 5,647,015 A * | 7/1997 | Choate et al. | 382/103 |
| 5,785,281 A * | 7/1998 | Peter et al. | 244/3.17 |
| 5,870,486 A * | 2/1999 | Choate et al. | 382/103 |
| 5,975,460 A * | 11/1999 | Elkanick et al. | 244/3.15 |
| 6,064,332 A * | 5/2000 | Cloutier | 244/3.19 |
| 6,142,412 A * | 11/2000 | De Sa et al. | 244/3.16 |
| 6,244,536 B1 * | 6/2001 | Cloutier | 244/3.19 |
| 6,254,030 B1 * | 7/2001 | Sloan et al. | 244/3.21 |
| RE37,331 E | 8/2001 | Schroeder | |
| 6,341,249 B1 | 1/2002 | Xing et al. | |
| 6,532,454 B1 | 3/2003 | Werbos | |
| 6,611,823 B1 | 8/2003 | Selmic et al. | |
| 7,043,345 B2 | 5/2006 | Warkomski et al. | |
| 7,080,055 B2 | 7/2006 | Campos et al. | |
| 7,185,844 B2 * | 3/2007 | Yanushevsky | 244/3.15 |
| 7,487,933 B1 * | 2/2009 | Chen et al. | 244/3.15 |

OTHER PUBLICATIONS

M.S. Bhat., D.S. Bai., A.A. Powly., K.N. Swamy., and D. Ghose., "Variable Structure Controller Design with Application to Missile Tracking," *AIAA Journal of Guidance Control and Dynamics*, vol. 24, No. 4 Jul. Aug. 2001 issue, pp. 859-862.

Shtessel Y., Shkolnikov, I., and Levant A., "Smooth Second Order Sliding Modes: Missile Guidance Application," *Automatica*, vol. 43, No. 8, 2007, pp. 1470-1476.

C. Tournes, Y.B. Shtessel, I. Shkolnikov, "Autopilot for Missiles Steered by Aerodynamic Lift and Divert Thrusters," *AIAA Journal of Guidance Control and Dynamics*, vol. 29, No. 3, May Jun. 2006 issue, pp. 617-625.

R. T. Yanushevsky, "Generalized Missel Guidance Laws Against Mannoevring Targets," *Proc.ImechE.*, vol. 221 Part I: Journal of Systems and Control Engineering, Jan. 19, 2007.

Y.B. Shtessel, C.H. Tournes, "Integrated Higher-Order Sliding Mode Guidance and Autopilot for Dual-Control Missiles," *Journal of Guidance, Control ,and Dynamics*, vol. 32,No. 1, Jan.-Feb. 2009.

P. Gurfiel., M. Jodorovsky., and M. Guelman., "Neoclassical Guidance for Homing Missiles," *AIAA Journal of Guidance Control and Dynamics*, vol. 24, No. 3 May, Jun. 2001 issue, pp. 452-459.

S. Gutman., "Can Lead-Guidance Compensator Guarantee Zero Miss Distance" *AIAA Journal of Guidance Control and Dynamics*, vol. 31, No. 3 May, Jun. 2008 issue, pp. 779-782.

R. T. Chen., J. L, Speyer. and D. Lianos., "Homing missile Guidance and Estimation Under Agile Target acceleration," *AIAA Journal of Guidance Control and Dynamics*, vol. 30, No. 6 Nov. Dec. 2007 issue, pp. 1577-1589.

D. Dionne., H. Michalska., and J. Shinar., and Y. Oshman., "Decision-Directed Adaptive Estimation and Guidance for an Interception Endgame," *AIAA Journal of Guidance Control and Dynamics*, vol. 29, No. 4 Jul. Aug. 2006 issue, pp. 970-980.

H. Hablani., "Endgame Guidance and Relative Navigation of Strategic Interceptors with Delays" *AIAA Journal of Guidance Control and Dynamics*, vol. 29, No. 1 Jan. Feb. 2006 issue, pp. 82-94.

I. Shkolnikov, Y. B. Shtessel, P. Zarchan, D. Lianos "Simulation Study of the Homing Interception Guidance Loop with Sliding Mode Observers Versus Kalman Filters," *Proceedings of 2001 AIAA Guidance, Navigation, and Control Conference*, AIAA Paper 2001-4216.

* cited by examiner

SYSTEM AND METHOD FOR GUIDING AND CONTROLLING A MISSILE USING HIGH ORDER SLIDING MODE CONTROL

RELATED APPLICATIONS

This application claims the benefit of U.S. Provisional Application 61/129,676, titled "High order sliding mode (HOSM) control method," Filed Jul. 11, 2008, which is incorporated herein by reference in its entirety.

GOVERNMENT RIGHTS

This invention was made with Government support under Contract HQ0006-08-C-7824 awarded by Missile Defense Agency. The Government has certain rights in the invention.

TECHNICAL FIELD OF THE INVENTION

The present invention relates to the control of missile trajectories homing to collide with a maneuvering target. More particularly, the use of a High Order Sliding Mode (HOSM) control adapted to the control of one or more functional subsystems of the homing missile, including the guidance, seeker, and autopilot subsystems.

BACKGROUND OF THE INVENTION

Missile guidance and control has received considerable attention in the last 50 years. Proportional Navigation (PN) and its multiple variants has been the preferred guidance technique. It is unfortunately based on the following assumptions:
 (i) The target has zero acceleration;
 (ii) The interceptor has a perfect dynamic response and perfect control of its acceleration;
 (iii) The interceptor is launched on a near collision condition;
 (iv) The interceptor has no longitudinal acceleration;
One or more of said assumptions is not applicable in challenging interception situations.

U.S. Pat. No. 6,244,536 B1 uses a modified formulation of PN called PRONAV and Riccati Equation. While the use of Riccati equation reduces the divert effort, it is predicated on the availability of good state models. U.S. Pat. No. 7,185,844 B2 and also Ref 1 introduces PN with a so called "parallel" navigation additional term proportional to the cube of the line-of-sight rate and additional term proportional to relative longitudinal acceleration, not easy to estimate very accurately and account for interceptor acceleration. The compensation for such effects is beneficial. Its explicit compensation as proposed in U.S. Pat. No. 7,185,844 B2 is only as good as the estimation/measurement of corresponding terms. In the present invention compensates for such effects without complex modeling of the effects and without being subjected to the effects of possible estimation errors. A number of works have addressed the problem of highly maneuvering targets and proposed solutions that require additional information. The so-called optimal law of reference 2 is applicable to first order interceptor response, requires good estimation of target maneuver and of tgo (time to go). Neoclassical Guidance in reference 3 does not require estimating target acceleration and tgo, but since it is based on adjoint techniques, it requires a good dynamical model of the interceptor flight control system and does not apply to the case of dual concurrent lateral controls. The claim that Neoclassical Guidance can force Zero Miss distance (ZMD) against any bounded target maneuver is questioned in Ref. 4. Reference 5 includes in the observer a set of maneuver patterns that enhance the prediction of target kinematics and a method based on differential game theory to adjust the gains of the guidance. The degree to which actual target maneuvers must "match" the models makes this approach not very realistic. The quest for better prediction of target maneuvers in Ref. 6 leads to use banks of filters with typical maneuvers and maneuver detectors. Here the problem is that the detection of a maneuver of change thereof takes some time if one wants to have enough confidence in the decision made and also the "mathematical" separation of the maneuvers may not be evident. The use of a Kalman Filter transition matrix with a ZEM based guidance in Ref. 7 helps in reducing the effects of delays but is only applicable for longer range exo-atmospheric guidance.

Kalman Filtering has been a technique of choice for estimating target motion. While it produces good estimations, its relatively slow convergence may cause it to be ineffective at the end-game when rapid target maneuvers are encountered. Reference 8 showed that Higher Order Sliding Mode Observers can provide faster and yet more accurate estimations than traditional Kalman Filter.

To be effective, a guidance law must be supported by a good autopilot. Most autopilot design are based on classical control techniques or on state feedback techniques that rely on internal mathematical models are only as good as the internal models. Further, the internal models are more and more expensive and difficult to develop as the domain of utilization of the missiles becomes larger and larger and as the accuracy is more than often questionable, which then degrades the accuracy of the guidance and control (G&C). Their validation using wind tunnels is also becoming increasingly difficult due to the cost of the energy required for simulating missile flights in the atmosphere at several thousand of meters per second. Most of the numerical codes calculating the flow around the missile and most of the wind tunnel experiments simulate steady state conditions that is, their governing equations do not include or model partial derivatives with respect to time. This assumption was reasonable up to now but is becoming increasingly questionable as missile with greater and greater agility and shorter time constants are designed. Working with non steady state computational fluid codes of designing non-steady state wind tunnel experiments increases dramatically the difficulty in generating realistic missile models. Thus, there is a need for more robust control systems and methods that are tolerant of complex and unpredictable interactions and adapt to changing dynamics resulting from effects such as hypersonic aerodynamics and interactions. Such hypersonic effects are described in Ref. 9. Such robust control must be able to work with nonlinear thrusters, to be insensitive to model variations caused by variations of altitude, mass, center of gravity, and other effects difficult to model or predict and that by not being dependent of missile specific mathematical model to allow a greater reuse of previous designs on new missiles.

U.S. Pat. No. 6,532,454, B1 uses adaptive techniques to estimate an interceptor model. While this approach works well when given enough time for the estimation process to settle, it cannot handle the case where rapid disturbances are created by the interaction between the firing of thrusters and the aerodynamic flow around the missile as described in Ref. 9. Another important issue is to achieve interceptor maneuverability as large as possible. This calls for operations in the endo-atmospheric domain for combined operation of several divert mechanisms, possibly several control surfaces. U.S. Pat. RE37,331 E where a forward placed thruster and tail (fin control) are used jointly to initiate a lateral maneuver faster and without non-minimum phase effects. One of the potential problems associated with this approach is that it requires accurate estimation of lateral divert and angular motion effects of each control that are by definition not measurable separately. A similar approach is described in Reference 10 where a dual control missile is fitted with the canard, primarily used to achieve the miss-distance and the tail for "trimming" the pitch attitude; the two surfaces are controlled with first order sliding mode controls approximated by high gain saturation which unfortunately cause the controllers to lose some of their robustness. U.S. Pat. No. 6,341,249 control satellite attitude using a Lyapunov Controller or a first order sliding mode controller. A short fall associated with the use of first order sliding mode control is that it achieves its robustness by high frequency (infinite switching rate) or eventually can be approximated by a sub-performing high gain approximation. Reference 11 proposes a Multiple Input Multiple Output solution to steer the angle of attack and pitch rate to satisfy a Lateral acceleration condition. It uses a Variable Structure Solution; unfortunately, it uses Euler Angles and its generalization to a Quaternion solution would be very difficult. U.S. Pat. Nos. 6,611,823 B1 and 7,080,055 B2 both address the problems associated with actuator nonlinearities as encountered with on-off thrusters and come up with complex neural network solutions requiring some "learning" hardly an option with missile systems.

Thus, there is a need for more robust control systems and methods that are tolerant of complex and unpredictable interactions and adapt to changing dynamics resulting from effects such as hypersonic aerodynamics and interactions

BRIEF DESCRIPTION OF THE INVENTION

High Order Sliding Mode (HOSM) control techniques are applied to the Guidance Control (G&C) of a interceptor missile in which velocity may be steered by combination of main thrust, aerodynamic lift and lateral on-off divert thrusters, and attitude may be steered by either continuous or by on-off actuators. Methods include the pointing of the seeker, its associated estimation processes, a guidance law that uses concurrent divert mechanisms, and an attitude autopilot. The insensitivity of the controller to matched disturbances allows the concurrent usage of the divert mechanisms without adverse effect on the accuracy. The controller also allows the de-coupling of the control of roll, pitch and yaw channels, and quaternions to represent body attitude and it provides control perfect robustness. While it is conceivable to design separately the components of the G&C method, it is widely accepted that designing them in an integrated fashion usually produces a better result.

The guidance and control methods of the present invention are applied to a very challenging missile configuration. For one, the interception can take place in the exo-atmospheric domain, after the end of boost with lateral divert accelerations being achieved by the firing of on-off divert thrusters. Further, the interception can occur while still boosting. In such case, lateral divert accelerations are achieved by orienting the missile body with respect to the velocity, and in such case when the interception occurs in the endo-atmospheric domain, lateral acceleration also includes aerodynamic lift. Likewise interceptor attitude, during autonomous Kill-Vehicle flight can be steered by the firing of on-off attitude thrusters and during the boost phase by the continuous TVC control or aerodynamic control surfaces. The methods presented can also be applied to simpler missile configurations operating in a single exo vs. end atmospheric domains.

A good example of this type of problem is the interaction of aerodynamic flow with divert attitude control thrusters placed on the sides of the missile as shown in FIG. 1. The jet flow coming out of the thrusters creates an obstacle to the airflow, thereby modifying the system of shock waves around the body and thus, aerodynamic forces. Conversely, thruster flow expansion, governed by the external pressure will differ different depending whether or not thrusters are being fired. These interactions may affect aerodynamic lift up to 30% in relative term and the effective forces of the thrusters by similar amount as indicated in the work of Kennedy[9] (Ref. 9.) Typical durations of thruster firing of 10-20 msec show that the effect is clearly a non-steady state effect.

Sliding Mode Control of $r^{th}$ order is said to exist if $\sigma, \dot\sigma, \ldots \sigma^{(r-1)} \to 0$ in finite time and stay there thereafter. The sliding variable and its derivatives up to $\sigma^{(r-1)}$ are continuous as illustrated by FIG. 2. Higher Order Sliding Mode Control laws are based on the property that some families of differential equations converge to zero in the presence of bounded right hand side of the equations as exemplified hereafter by the so called "super-twist" algorithm.

$$\dot{x}+\overline{\omega}_1|x|^{1/2}\operatorname{sign}(x)+\overline{\omega}_2\int \operatorname{sign}(x)d\tau=\xi(t) \qquad (1)$$

One can demonstrate that $x,\dot{x} \to 0$ converge to the origin in finite time in the presence of unknown and bounded right-hand side term $\xi(t)$. The terms $\overline{\omega}_1, \overline{\omega}_2$ are calculated based on the upper bound $|\dot\xi(t)| \leq L$ of the first time derivative of the unknown right-hand side term as $$\begin{cases} \overline{\omega}_1 = 1.5\sqrt{L} \\ \overline{\omega}_2 = 1.1 L \end{cases} \qquad (2)$$

The finite convergence time $\tilde{t}_r$ is given by $$\tilde{t}_r \leq \frac{7.6|x(0)|}{\overline{\omega}_2 - L} \qquad (3)$$

The design of a control law can then proceed as follows. The dynamics of the sliding surface is represented as $$\sigma^{(n)} = f(y,t) + d - bu \qquad (4)$$

where f(y,t) represents the nominal response other than caused by control term bu and d represents the effects of unknown disturbances and (n) represents the relative degree of the sliding surface dynamical model that is, the number of successive time-differentiation required for the control term to appear explicitly in the right-hand side.

The algorithm used as example, shown here applies to systems of relative degree n=1. Finally using the insensitivity property discussed before it is possible to treat the combined effects of f(x,t)+d as the disturbing term $\xi(t)$ in Eq. (3) and to design accordingly the continuous control as $$u = \overline{\omega}_1|\sigma|^{1/2}\operatorname{sign}(\sigma) + \overline{\omega}_2\int \operatorname{sign}(\sigma)d\tau \qquad (5)$$

This means that one can design an accurate control with required knowledge of the plant barely limited to the so called Lipchitz bounding constant L in Eq. (2) and the approximate knowledge $\overline{b}$ of term b in Eq. (3). With $b=\overline{b}+\tilde{b}$ one can rewrite Eq. (3) as $$\dot\sigma = f(y,t) + d - \overline{b}u - \tilde{b}u \qquad (6)$$

and treat the term $\tilde{b}u$ as part of the disturbing term f(y,t)+d−$\overline{b}u$.

Higher Order Sliding Mode Control is able to drive the sliding variable and its n−1 consecutive derivative to zero in finite time while the sliding variable dynamics given by a generalized version of eq. (4) that uses a differential inclusion terminology:

$$\sigma^{(n)} \in [-C, C] - [K_m, K_M] u$$

where $|f(y,t)+d| \leq C$ and $K_m \leq b \leq K_M$, $C>0$, $0<K_m<K_M$.

Higher Order Sliding Mode control techniques represent a paradigm shift, in the sense that 1. HOSM is an output control technique that does not rely on a dynamical model of the system's response and as such is perfectly robust.
2. The gain are based on inequality relations, therefore the control works perfectly as long as the magnitude of the disturbing term is within the bounds used to calculate the gains as per Eq. (2).

A first important contribution of this invention is to allow concurrent use of various divert mechanisms such the firing of lateral divert thrusters, aerodynamic lift, main booster/sustainer by orienting the missile body. When several divert mechanisms and conventional control techniques are used the two main possible approaches are:

1. Nested control loops where the outer-loop set the effect to be produced and the inner loop manages to achieve that effect. For example an outer; guidance loop will calculate the commanded lateral acceleration and calculate the required angle of attack required. The inner loop will track said angle of attack. It is a good design practice to have the characteristic frequency(ies) of inner loop to have a magnitude at least three times the magnitude of outer-loop characteristic frequencies. Since inner loops responses are inevitably limited, this staging adversely affects the response of the outer-loop.
2. Multiple input-Multiple Output (MIMO) designs are organized with a single multiple variable feedback but require modal decompositions the accuracy of which becomes questionable as the order of the system exceeds 5-6 even with good models and are very strongly adversely affected by model errors.

Here by concurrent use of several divert mechanisms we mean that two control loops controlling separate divert mechanisms can be designed independently one from another, and yet achieve effective cooperative operation of the diverts, with their responses not being hampered by the necessary staging of the eigenvalues in nested loops or by the robustness issues of large MIMO designs Control techniques require the number of inputs, i.e. controlled variables and outputs, i.e. actuator command to be the same. With conventional control methods, when several divert mechanisms are used concurrently to achieve lateral divert acceleration, it is necessary to design separate control laws, one per independent divert mechanism, yet there only one output available which is the lateral acceleration. The usual remedy, is to include internal models that estimate, in real-time, what is the contribution of each divert mechanism. For example when aerodynamic lift and divert thrusters are used, the internal model will estimate what would have been the lateral acceleration produced by aerodynamic lift, had it been used alone. In practice this is difficult because those are transient response models and in most of the case divert responses are not de-coupled as discussed before. Evidently, failure to account exactly for the effects of each actuator will have a strong adverse effect on control accuracy and may even lead to unstable conditions.

In one embodiment of the invention, the missile commanded acceleration may be achieved using combination more than one of divert mechanisms such as orientation of main/sustainer thrust with respect to velocity vector, aerodynamic lift and divert thrusters. Setting several sets of actuators (control outputs) to achieve a single input (guidance law) requires when conventional control techniques to have accurate explicit knowledge of the effects of each set of actuators and to set a control allocation strategy. The usage of higher order sliding mode control allows overcoming this limitation. For that matter one the divert mechanisms is defined as the primary control. The choice of primary control is based on the response time of said control, the smallest the better and requires said control for achieving a sufficient share of total control effort, typically larger than ⅓; in a missile application the divert thrusters is the preferred choice.

The present HOSM method, illustrated hereafter allows using several divert mechanisms without resorting to complicated and eventually uncertain model, without any loss of performance and with a much simpler architecture.

The interception strategy (for the pitch and the yaw channels) is represented by a sliding surface function of several variables that must be steered to zero and kept null thereafter.

$$\dot{\sigma}_{(.)} = f_{(.)} + g_{(.)} - b \Delta_{(.)}; \ (.) = \text{pitch, yaw} \quad (7)$$

where $f_{(.)}$ is a function that will be compensated explicitly and $g_{(.)}$ a bound unknown disturbance to be compensated implicitly and $\Delta_{(.)}$ represent the command of divert thrusters (assumed to be continuous in this illustration for simplicity sake). The use of HOSM technique gives the designer considerable latitude in the choosing of which terms should be compensated explicitly and which should be compensated implicitly. It is possible to have all the effects compensated implicitly in which case $f_{(.)}=0$ or conversely try to model or estimate all the effects, for them to be compensated implicitly, in such case the $g_{(.)}$ will only compensate for $\tilde{f}_{(.)} = f_{(.)} - \hat{f}_{(.)}$ the estimation errors of $f_{(.)}$.

The direct smooth guidance law based on another family of HOSM differential equations is given by:

$$\Delta_{(.)} = \frac{1}{\bar{b}} \left\{ \hat{f}_{(.)} + \alpha_1 |\sigma_{(.)}|^{2/3} \text{sign}(\sigma_{(.)}) + \alpha_2 \int |\sigma_{(.)}|^{1/3} \text{sign}(\sigma_{(.)}) d\tau \right\} \quad (8)$$

Where $\bar{b}$ represents the estimated maximum dynamical effect of normalized divert control $\Delta_{(.)}$. At the same time attitude command $\delta_{(.)} = h(b\Delta_{(.)})$, function of desired acceleration is applied to the autopilot producing acceleration $\Delta\Gamma(\delta_{(.)})$.

Equation (7) can be written as $$\dot{\sigma} + \alpha_1 |\sigma_{(.)}|^{2/3} \text{sign}(\sigma_{(.)}) + \alpha_2 \int |\sigma_{(.)}|^{1/3} \text{sign}(\sigma_{(.)}) d\tau = \xi(t)_{(.)} \quad (9)$$

Equation (9) represents another family of differential equations that guarantees simultaneous convergence of $\sigma_{(.)}, \dot{\sigma}_{(.)} \to 0$ in the presence of bounded unknown right hand side term, provided that $\alpha_1, \alpha_2$ have been selected taking in to consideration the bounding condition for the derivative of the disturbing term $\xi(t)_{(.)}$.

$$\xi(t)_{(.)} = g_{(.)} - \Delta\Gamma_{(.)} + \tilde{f}_{(.)} \quad (10)$$

The right side disturbance equals the initial disturbance $g_{(.)}$ + the estimation error $\tilde{f}_{(.)} = f_{(.)} - \hat{f}_{(.)}$ minus $\Delta\Gamma_{(.)}$, the effect of the attitude maneuver.

This shows that additional divert mechanisms (the orientation of the main thrust and possibly aerodynamic lift reduce the magnitude of the disturbance $|\xi_{(.)}| < |g_{(.)}|$ thereby permitting effective guidance that may not have been achievable solely with divert thrusters.

Stated alternatively, such secondary control in claim 3 creates a "cooperative" disturbance that reduces the initial magnitude of the bound disturbance as $$g2_{(.)} = g_{(.)} - \Delta \Gamma_{(.)}$$

Allowing engaging targets engaging in lateral acceleration exceeding maximum divert capability $\bar{b}$ achievable by principal control alone. The cooperative disturbance needs not to be calculated to match exactly commanded acceleration nor do inaccuracies thereof have any adverse effect on the performance accuracy of the guidance. The response time of cooperative disturbance needs not match the dynamics of the target maneuver as this is the case when aerodynamic lift is used as secondary control and slower response thereof has no adverse effect on the performance accuracy of the guidance.

A second important contribution of this invention is the slewing of the bore-sight and design of associated HOSM based estimators of the target motion that provides shorter settling times than traditional Kalman Filters together with better accuracy.

A third contribution of the present invention is a method for guiding the missile. Most missile guidance is based on some form of Proportional Navigation (PN) or some of its derivatives such as Augmented Proportional Navigation (APN) or Zero Effort Miss (ZEM) that are based on assumptions discussed before.

The proposed method consists in regulating a linear combination of the target relative position error perpendicular to the bore-sight and the corresponding velocity conducive to setting the interceptor in collision course in a prescribed time using a HOSM control law which, by its inherent insensitivity to matched disturbances, also compensates implicitly for other uncertainties and alleviates the need for additional explicit terms accounting inter-alia for the variation of interceptor longitudinal velocity.

A fourth contribution of the invention is the HOSM quaternion based autopilot. The interceptor considered has two modes: the first mode during boost phase where attitude motion is steered by continuous TVC control, and the second mode used during autonomous KV flight where attitude is controlled by the on-off firing of PWM attitude thrusters. Clearly the methods could apply to a missile only operating with one type of attitude control. The use of quaternions avoids using Euler Angles. A first inconvenient of Euler Angles is their singularity of pitch angle $\theta = \pm \pi/2$ encountered with vertical launches. Another inconvenient their coupling, whereas a pitch torque only creates a pitch acceleration, but roll or yaw torques create roll, and yaw accelerations.

Liquid thrusters can be continuously throttled from a minimum to a maximum value. Solid thrusters are preferred, in many applications for their easier handling and storage. Their simpler mode of operation is on-off. Several seconds before intercept a gas generator is ignited which produces. The gas can be ejected through several valves, the opening and closing thereof is defined according to the direction in which the force must be produced, typically up/down, left/right. In the case where no force is required the four valves are opened simultaneously. This is an on-off operating mode, which is PWM modulated by the duration of the opening sequence.

With conventional control techniques and on-off thrusters, a continuous control law is first designed assuming that proportional continuous thrusters are used. The continuous control law is then redesigned to be used with on-off thrusters. For that matter the redesigned on off law is designed to produce equivalent effects than the original continuous law. Said "equivalent" law is predicated on "ideal" rectangular pulses. The departure from this assumption leads to severe degradation of performance accuracy or even to the control stability. In practice with short thruster firings, actual thruster accelerations are far from their predicated "ideal" shapes and thus, such PWM control laws exhibit poor performance.

In order to overcome this hurdle, continuous throat able solid thrusters have been developed in particular by Aerojet Corp. Since the thrusters have to produce a thrust proportional to the command, with good scale and linearity performance, their design is significantly more complex than the simpler on-off design presented before. Owing to its nonlinear nature HOSM control works equally well with on-off actuators as with continuous actuators and allow usage of simpler and much less expensive thrusters without sacrificing performance.

The present invention has application in endo and exo-atmospheric and combined endo & exo-atmospheric missiles.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Figure 1:
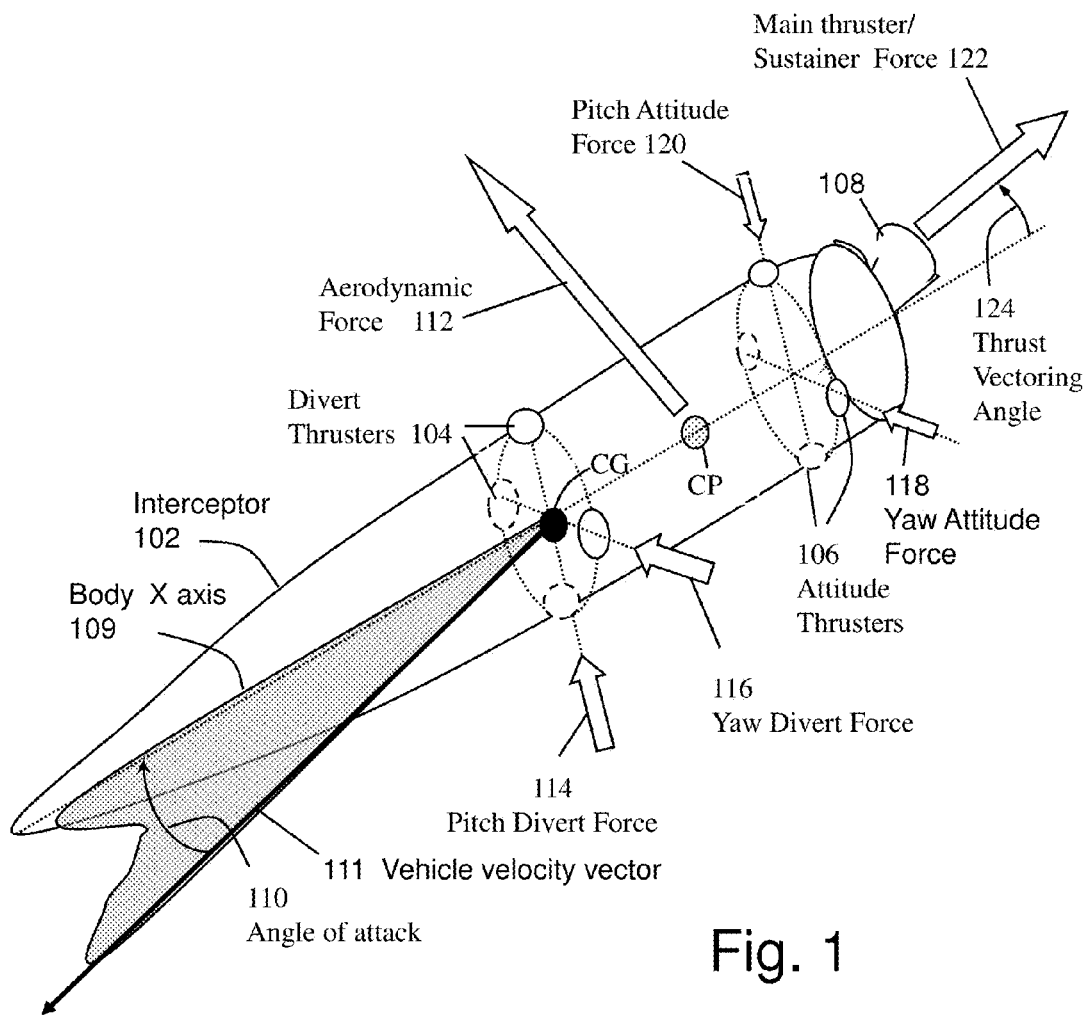
FIG. 1 illustrates an exemplary missile to be controlled by the control system of the present invention.

The present invention relates to the control of missile trajectories homing to collide with a maneuvering target. Missile considered includes a seeker with its associated process used for keeping the seeker pointed in the direction of the target and for estimating target motion; guidance law which calculates commanded acceleration conducive to interception and an automatic pilot process which translates the commands into adequate actuator commands. The missile is equipped with Inertial Navigation Sensors (INS) and their associated process that calculates interceptor kinetics, attitude and attitude rate which is outside the scope of this invention. Up to now the laws controlling different processes where designed taking into consideration or included internal mathematical models of the dynamic response of the process; and the performance of the control law was only as good as the model. The present invention is based on the use of a novel control technique, called Higher Order Sliding Mode control HOSM), that allows circumventing therein the use of said mathematical models which are difficult and expensive to develop.

In accordance with the present invention, multiple benefits and features are realized including:

The system achieves perfect robustness of the design as long as the disturbances are within bounding conditions.

The system allows to not representing explicitly part of system dynamics thereby enabling significant architectural simplifications.

The usage of higher order sliding mode control techniques allows treating terms of the interceptor attitude dynamic response as unknown bounded disturbances and thereby avoiding the development of complex and error prone non-linear coupled dynamical models.

The system as a non-linear control method can generate either continuous commands to continuous actuators such as control surfaces or to on-off discontinuous actuators without major design changes and loss of performance.

The system achieves finite time convergence, the effect of which is that when nested loops are used, the convergence of the inner loop makes it to become an identity as seen from the outer loop, which as a beneficial impact on reducing the settling time of control loops.

The usage of higher order sliding mode control techniques allow concurrent usage of multiple divert mechanisms without a complex control coordination strategy.

The usage of higher order sliding mode control techniques allows controlling attitude motion either using continuous actuators such as thrust vectoring or aerodynamic control surfaces of on-off discontinuous actuators with minor design modifications and without loss of accuracy performance.

The usage of Higher Order Sliding mode Control allows implicit compensation for disturbing effects such as bending modes or mirror orienting motors bias and random walk. The usage of higher order sliding mode control techniques allows to implicitly compensating for terms disturbing the guidance law, and in particular the effects of target acceleration or errors in the estimation thereof.

Background

FIG. 1 illustrates an exemplary missile to be controlled by the control system of the present invention. FIG. 1 shows an interceptor 102 having divert thrusters 104, attitude thrusters 106, and thrust vector control (TVC) 108, wherein the primary acceleration thrust 122 may be directed off axis 109 at a thrust vectoring angle 124. The divert thrusters typically apply divert thrust 116 or 114 at or near the center of gravity (CG) of the interceptor to cause a lateral divert motion and create a disturbing attitude moment with a maximum magnitude typically less than 10% of the maximum attitude moment achievable by means of attitude controls and thus without substantially affecting the control of the attitude angle of attack 110. The interceptor 102 attitude may be steered by moments created by TVC or by attitude thrusters. Divert and attitude thrusters may be proportional control thrusters producing a thrust continuously adjustable between minimum and maximum values; or on-off thrusters that provide full thrust or nothing are typically lower cost.

Attitude thrusters apply a pitch 120 or yaw 118 moments or alternatively the deflections of TVC deflection or the deflection of aerodynamic surfaces creates a pitch or yaw moment. When the dynamic pressure is sufficient, aerodynamic angles 110 produce aerodynamic lift applied at the Center of Pressure (CP) and an aerodynamic moment that combines with the moments generated by the controls. The total moment produces angular accelerations around the CG that modify the body axis 109. The sum of lift forces with thruster forces and gravity forces also modify the orientation and magnitude of the velocity vector 111. Aerodynamic angle is the angle between the body axis 109 and the velocity vector 111. In general with sufficient dynamic pressure, the magnitude of acceleration produced by aerodynamic effects can be up to twice the magnitude of the acceleration produced by divert thrusters, but conversely the response time is slower. HOSM autopilot allows considerably increasing the total lateral acceleration of the missile while retaining the short response of the divert thruster.

Sliding Mode Control

The present invention utilizes concepts related to sliding mode control to achieve improved control of the missile. Sliding mode control is a form of variable structure control where the control structure switches between multiple control laws. Each control law always moves toward the switching condition, which defines the sliding surface. High order sliding mode control further improves single order sliding mode control by driving the system not only to zero the sliding surface, but one or more successive time derivatives of the sliding surface. This can provide smooth continuous operation even with the use of discontinuous controls such as switching controls.

Figure 2:
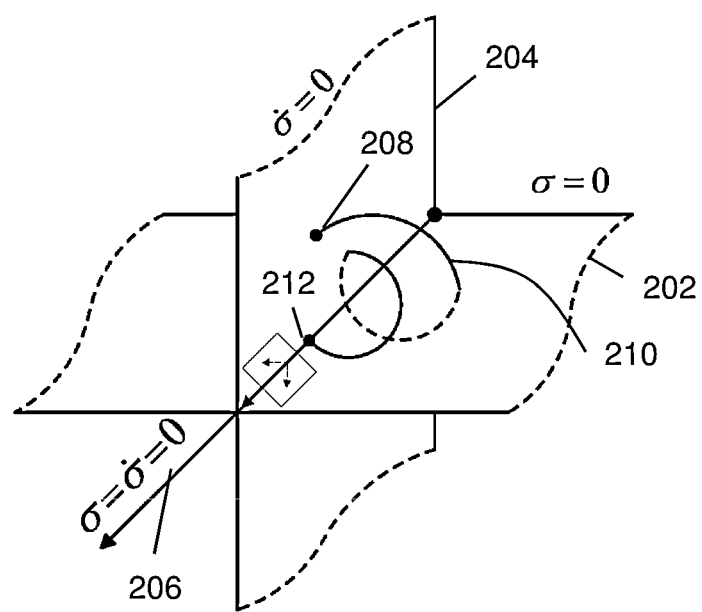
FIG. 2 illustrates the convergence of multiple time derivatives of the sliding surface.

FIG. 2 illustrates the convergence of multiple time derivatives of the sliding surface. FIG. 2 illustrates a states space with a first hyper-plane sliding surface 202 representing $\sigma=0$, second hyper-plane sliding surface representing $\dot\sigma=0$ and possible additional surfaces representing $$\overset{(2)}{\sigma} = 0, \ldots \overset{(n)}{\sigma} = 0,$$

the intersection of the sliding variables is the line 206 that represents $\sigma=\dot\sigma=0$. The system has an initial condition at point 208. The control structure drives simultaneously $$\sigma, \dot\sigma, \overset{(2)}{\sigma} = 0, \ldots \overset{(n)}{\sigma} \to 0 \text{ to } 212$$

whereupon the simultaneous solution is maintained thereafter in the presence of unknown, bounded disturbances.

Navigation Coordinate Systems

Figure 3:
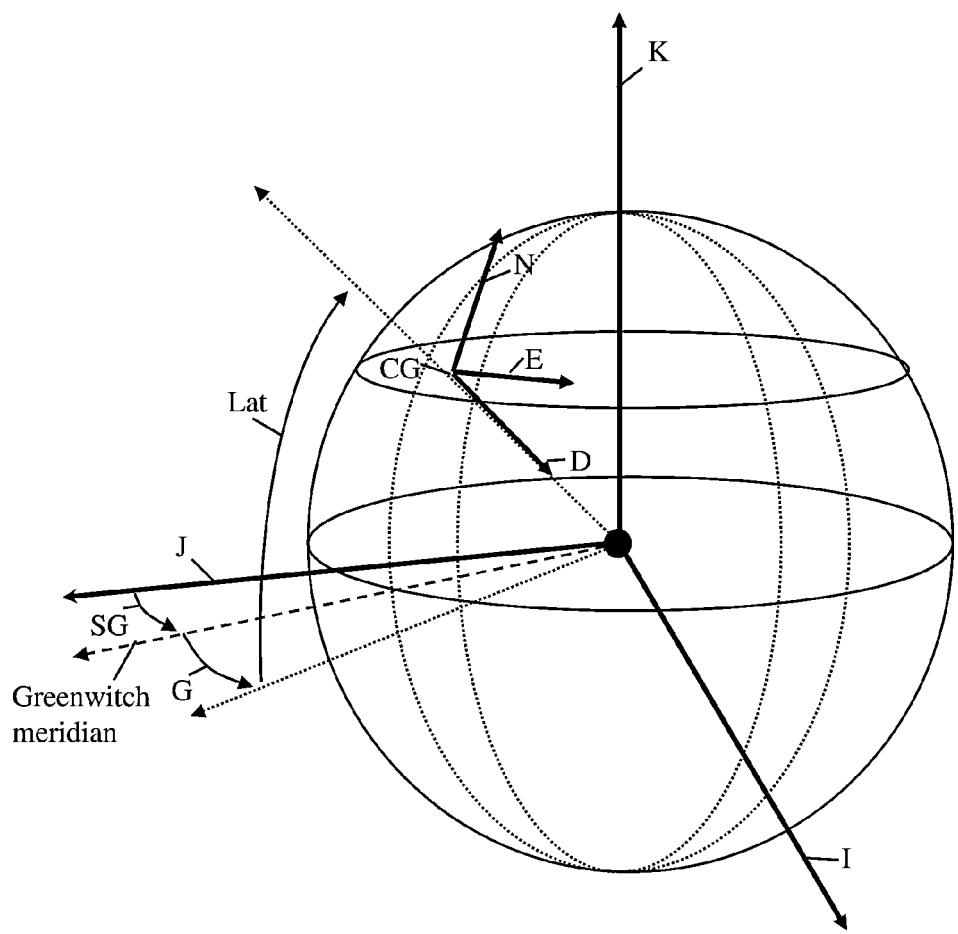
FIG. 3 illustrates the relation of Earth Centered Inertial (ECI) axes and North East Down (NED) axes.

FIG. 3 illustrates an exemplary relation of Earth Centered Inertial (ECI) axes and North East Down (NED) axes. Earth Centered Inertial frame is composed as follows. They originate from the center of Earth, the first I axis is oriented along the direction of Aries, the third axis K is oriented along the polar line and second axis J forms with the two other an orthogonal frame. Earth Center Inertial axes do not rotate with Earth's daily rotation. North East Down axes are centered on the vehicle CG. The down axis is along the local vertical to the center of Earth, the North axis is parallel to the local meridian G (longitude) and the East axis parallel the local parallel Lat (latitude). FIG. 3 illustrates the principle components of each coordinate system. Numerous variations and detail considerations may be included in a complete coordinate system definition.

Body to Navigation Coordinate Systems

Figure 4:
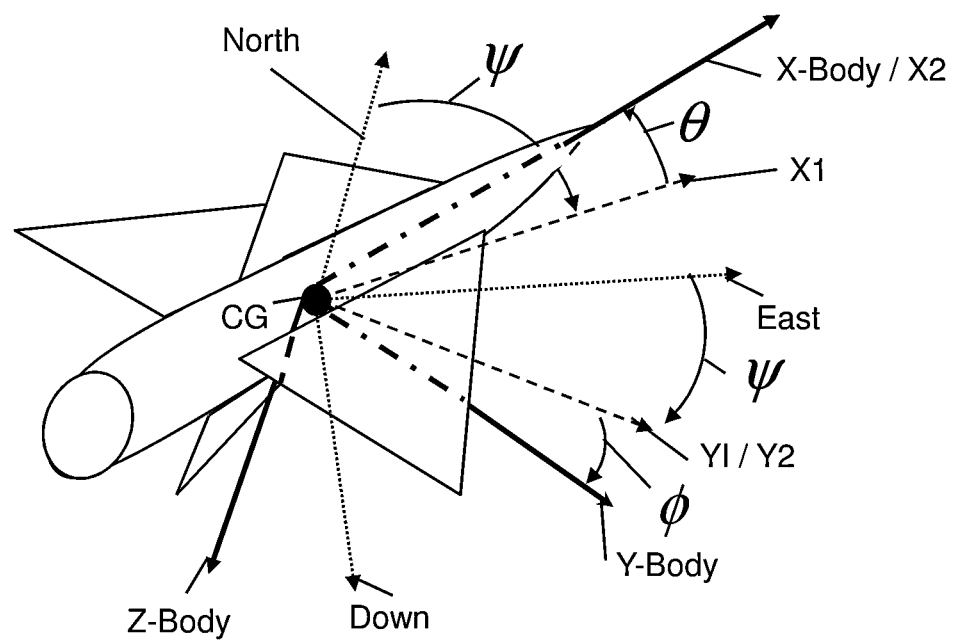
FIG. 4 illustrates the relation of NED axes with body axes.

FIG. 4 illustrates the relation of NED axes with body axes. One can note that the first rotation is around the Down axes and is called yaw angle ψ; the rotation defines an intermediate reference X1, Y1, Down. A second rotation around Y1 of the pitch angle θ defines a second intermediate reference X2, Y2, Z2. A third rotation around X2 of angle φ leads to the body axes.

Missile Control System and Method

The present invention relates to a missile control system and several subsystems of the missile control system as implemented together or separately. It should be understood that the total system represents at least one embodiment, and that each subsystem comprising the seeker observer block, the guidance block, the attitude command block, and/or the autopilot block may be used separately or in combination with one or more of the other blocks and may be used in combination with conventional blocks replacing one or more of the other blocks. As should be understood by the following disclosure that certain synergistic benefits and efficiencies may be achieved by combining two or more of the blocks herein described.

Figure 5:
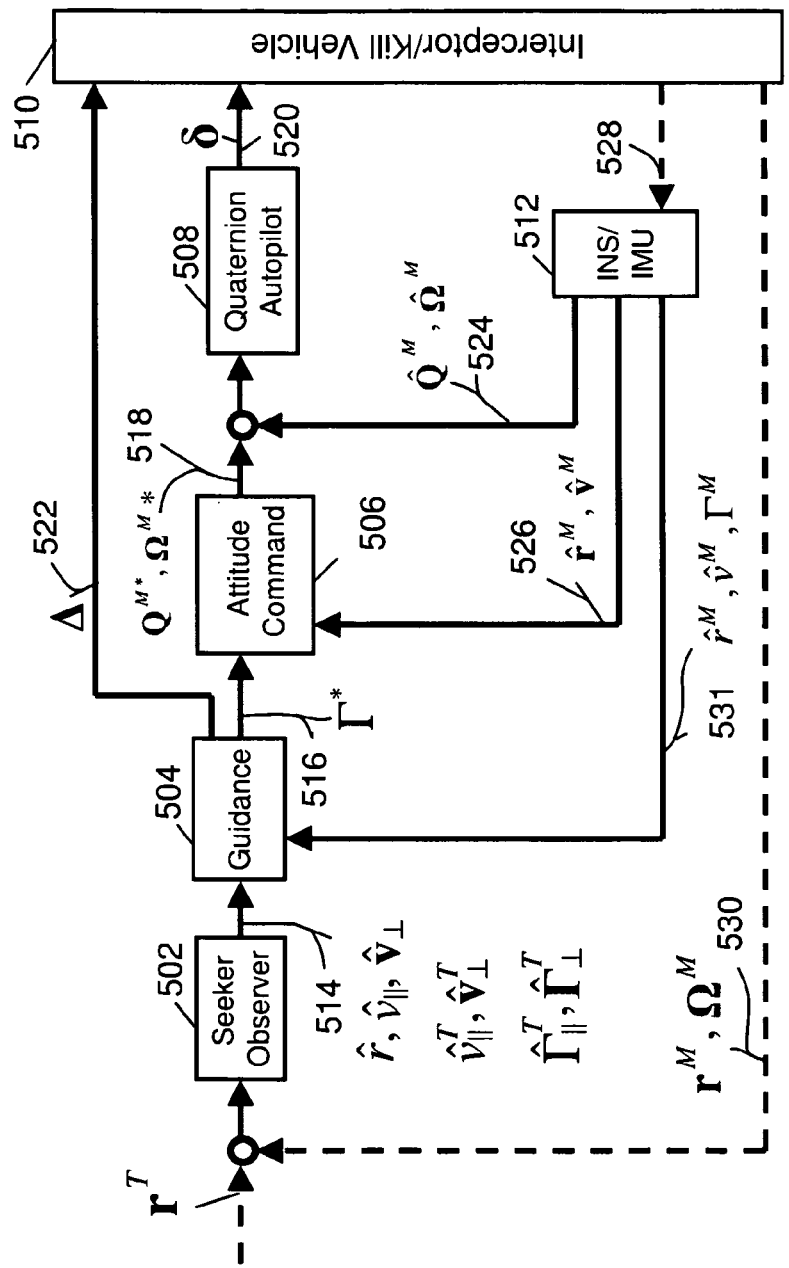
FIG. 5 illustrates control architecture in accordance with the present invention.

FIG. 5 is a functional block diagram of an exemplary missile control system in accordance with the present invention. Referring to FIG. 5, the missile control system 500 comprises the seeker observer 502, the guidance 504, the attitude command 506, and the quaternion autopilot 508. The autopilot 508 controls the vehicle control actuators of an interceptor 510 (alternatively referred in its terminal autonomous configuration as a kill vehicle (KV)). Typical control actuators include but are not limited to lateral thrusters, attitude thrusters, thrust vector control servos (TVC) and other devices. The interceptor 10 then responds according to a kinematic response, which may include aerodynamic responses. The kinematic response is measured by Inertial Navigation System (INS) 512. The INS comprises Inertial Measurement System (IMS); a set of gyroscopic and accelerometer sensors and possibly other sensors and a set of processes combining the measurements of said sensors for calculating interceptor position, velocity, and attitude to the attitude command block 506 and body attitude and roll rates to the autopilot 508. Estimated interceptor positional and angular dynamics are used in seeker 502.

The missile control system main functional blocks are:

1) Seeker observer block 502: The seeker observer block 502 performs the estimation of the target-interceptor relative motion as well as steering of the bore-sight line in the target direction in an integrated fashion that considerably reduces seeker noise effects. Block 502 uses seeker measurement of target angular error with respect to bore-sight, and interceptor body rate measurements bore-sight direction and estimations by the interceptor Inertial Measurement Unit (IMU) of its position, velocity, and acceleration. Block 502 includes an observer that estimates the components of target relative location parallel and perpendicular to the bore-sight, as well as the corresponding components of target velocity and acceleration.

2) Guidance block 504: The inputs are the outputs of observer block 502. The Guidance block 504 calculates commanded normal and transversal acceleration. The guidance block 502 has access to target range and range rate either through uplinks and dead-reckoning or with range sensors.

3) Attitude command block 506: The attitude command block 506 calculates the prescribed transformation matrix from body frame to reference frame used (i.e., ECI). Two modes are considered. In the boosting mode, changes in body attitude are commanded to achieve desired normal/transverse acceleration. This mode is also used during Kill Vehicle, KV flight when there is enough dynamic pressure to achieve substantial divert acceleration. The second mode aligns the body with the velocity frame during KV autonomous flight when the dynamic pressure is too small or any other prescribed body attitude with respect to interceptor velocity. The commands generated are the prescribed quaternion representing the rotation from reference axis to the body axes, the associated transformation matrix, its time-derivative, and the prescribed attitude rate in body axes.

4) Autopilot block 508: The autopilot 508 steers the body attitude as prescribed and commanded by the attitude command block 506. The quaternion error is used to calculate attitude errors (referred to as "integral errors"). During the boost phase and initial KV autonomous flight, on-off Pulse Width Modulated (PWM) roll actuator and continuous pitch and yaw Thrust Vectoring Commands (TVC) are used. During the KV endgame, three roll, pitch and yaw on-off attitude thrusters are used. The same autopilot is used during boost and KV endgame. The only difference is that control of the TVC continuous actuators used in the boost phase whereas the control of on-off thrusters during the KV endgame they applied to on-off thrusters.

Continuous lines in FIG. 5 represent data transmission, whereas the dashed lines represent kinematic returns.

Data transmission exchanges:

From the seeker to the guidance: missile ECI position, target parallel component and perpendicular components of the velocity with respect to bore-sight, respectively $\hat{r}, \hat{v}_{\|}, \hat{v}_{\perp}$, Target estimated velocity1 $\hat{v}_{\|}^T, \hat{v}_{\perp}^T$ and acceleration components v$\hat{\Gamma}_{\|}^T, \hat{\Gamma}_{\perp}^T$ with respect to bore-sight represented by 514.

From guidance to attitude command block: The two components of commanded acceleration perpendicular to missile velocity, represented by 516.

From attitude command block to autopilot bloc: Quaternion defining prescribed body orientation $$Q_{ECI}^{*body} = Q^{*M}$$

of body axes with respect to reference frame i.e. (ECI) as well as the prescribed body rate $\Omega^{*M}$ represented by 518.

From autopilot to actuators $\delta = \{\delta_l, \delta_m, \delta_n\}$ roll, pitch and yaw actuator commands as represented by 520. During the boost phase the command respectively the roll on-off actuator and pitch and yaw continuous actuators. During terminal KV flight they command roll, pitch and yaw on-off actuators.

From guidance to divert actuators: $\Delta=\{\Delta_m,\Delta_n\}$ respectively normal and transversal divert on-off thrusters, represented by 522.

From Inertial Navigation System (INS) to autopilot:

$$\hat{Q}^{body}_{ECI} = \hat{Q}^M$$

estimated value of the quaternion defining body attitude with respect to reference, and estimated attitude rate $\hat{\Omega}^M$, represented by 524.

From INS to attitude command: $\hat{r}^M, \hat{v}^M$ respectively missile estimated ECI position, velocity and represented by 526.

From INS to seeker: $\hat{r}^M, \hat{v}^M, \hat{\Gamma}^M$ respectively missile estimated ECI position, velocity and acceleration represented by 531.

Kinematic Exchanges:

From missile airframe to INS: Sensed acceleration and rotation rate, represented by 528.

From missile airframe to seeker: Missile position and missile attitude represented by 530.

Figure 6A:
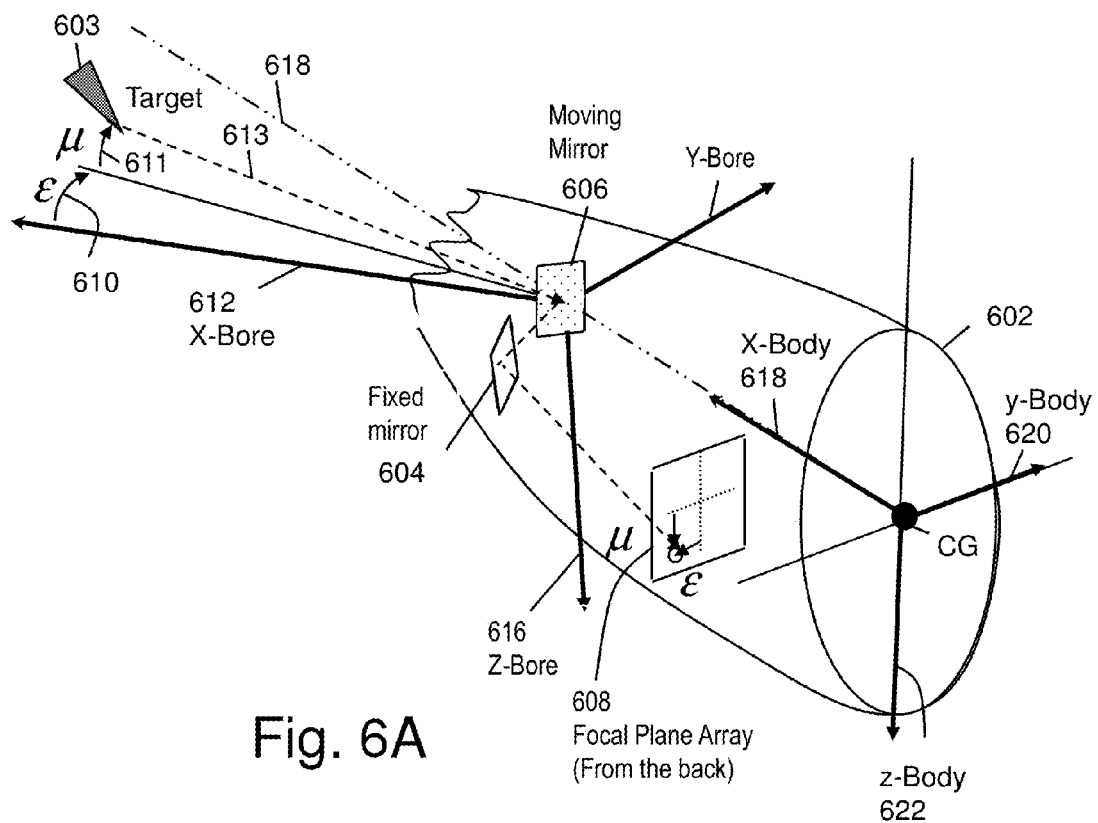
FIG. 6A illustrates an exemplary seeker configured with a fixed and rotating mirror.

A feature of this design is that during the KV flight the guidance block generates the commands 522 for the divert thrusters using the inputs 514 from the seeker. At the same time the guidance block generates an attitude command 518 that will result in the autopilot commanding attitude thrusters to assist the divert thrusters through aerodynamic lift effects. This assistance effect is handled by the guidance algorithm as a bounded "cooperative" disturbance relative to the control command 522 for the divert thrusters. The invariance property of the HOSM controller design to matched disturbance allows the guidance control to take into consideration the effects of this "cooperative disturbance" without having to estimate the effect explicitly as conventional control techniques require. The net effect will be that the cooperative disturbance or sum thereof will alleviate the control that the divert thrusters have to accomplish in order to steer the missile into a collision condition. A collision condition refers to the combined velocity and direction of the interceptor and target such that, without further control of the interceptor or maneuver of the target, the two will remain on a collision course. The guidance objective is to first guide to a collision condition and then to maintain the collision condition to intercept in the presence of disturbances. Here the control command is issued directly from the guidance to the divert thrusters in a more efficient way than proposed in previous works [15-16] where a commanded trajectory is calculated from the guidance command, where a trajectory autopilot tracks that intermediate trajectory command and generates direct actuator commands Second Embodiment, Seeker Control The second embodiment is illustrated in FIG. 6A. FIG. 6A illustrates an exemplary interceptor 602 with a seeker configured with a fixed mirror 604 and a rotating mirror 606. Two types of seeker mounts are typically used in a missile; the first one places the seeker sensor, i.e. focal plane array on a gimbaled gyroscopically stabilized platform, the second, strap-down mount employs a rotating mirror which reflects the incoming ray from the target onto the focal plane array fixed onto the missile structure as shown in FIG. 6. Note that the objects of FIG. 6A are not necessarily drawn to scale relative to one another. One should appreciate that the seeker subsystem is severable and may be used alone or in combination with one or more of the other subsystems of the present disclosure. Different element of this method, either compensate implicitly or explicitly for disturbing terms, the integrated design by accounting for the effects of multiple sources of uncertainty across different elements of the guidance suite, does a better job than a collection of separate designs because it accounts for such effects coherently.

Referring to FIG. 6A, the focal plane array 608 does not measure directly the target elevation and azimuth angles because the field of view is much too small, but rather measures the offset 610 and 611 of the target from a bore sight line representing the center of the focal plane array as directed by the moving mirror 606. Either the gimbaled platform or mirror is slewed such as to maintain the spot representing the incoming direction of the rays centered on the focal plane array. The exemplary moving mirror configuration used in this application represents the more challenging case compared with the gimbaled seeker because the measurements are directly affected by the attitude motion of the interceptor, which makes the technical challenge more difficult. Seeker mounted on gyroscopically stabilized platforms or with intermediate mirrors is not new and this new method is not about a new specific hardware design thereof. This method is about a new algorithm for controlling the slewing of the bore-sight in the direction of the target.

By mounting gyroscopic and accelerometer sensors onto the gimbaled platform one can measure the accelerations and attitude rate to which the gimbaled platform is subjected. The angular rate of the platform, provided that the target spot is maintained on the center of the focal plane array, can be used by the guidance law.

With strap-down mounts, as shown in FIG. 6A, the situation is a little bit more complicated. For one, the focal plane array rotates with the missile body, and the rotation angle of the mirror 606 is half the angle between the Line of Sight (LOS) 613 and the longitudinal axis 618 of the missile body. The rotation of the bore-sight line 612 is then, going to be the sum of the angular rate of the missile body 618+twice the rotation rate of the mirror 606 with respect to the missile body 618.

The bore-sight frame is defined as shown FIG. 6A by axes x-bore 612, y-Bore 614, z-Bore 616 respectively the bore-sight direction, horizontal vector orthogonal the x-bore and a third vector in the z-plane to for a direct reference. Likewise, we have traditional body axes x-Body 618, y-Body 620, z-Body 622 as represented in FIG. 6A.

The quaternion representing the transformation from bore-sight-axes/LOS to some reference (in this case Earth Centered Inertial) is represented by:

$$Q^{ECI}_{Bore} = \int \begin{pmatrix} \begin{bmatrix} 0 & 0 & -\zeta & -\dot{\upsilon} \\ 0 & 0 & \dot{\upsilon} & -\zeta \\ \zeta & -\dot{\upsilon} & 0 & 0 \\ \dot{\upsilon} & \zeta & 0 & 0 \end{bmatrix} Q^{Bore}_{Body} dt \end{pmatrix} Q^{ECI}_{Bore} \quad (11)$$

where $\zeta, \nu$ are the rotations in pitch and yaw respectively. When a gimbaled platform is used, the formulation is simpler:

$$Q^{ECI}_{Bore} = \int \begin{bmatrix} 0 & 0 & -\zeta & -\dot{\upsilon} \\ 0 & 0 & \dot{\upsilon} & -\zeta \\ \zeta & -\dot{\upsilon} & 0 & 0 \\ \dot{\upsilon} & \zeta & 0 & 0 \end{bmatrix} Q^{ECI}_{Bore} dt \quad (12)$$

The present method applies HOSM control techniques for achieving the combined slewing and estimation of target motion. The algorithm achieves:

a. The slewing of the bore-sight line towards the target.
b. The estimation of the rotation rate of the bore-sight line.
c. The estimation of target acceleration.

The rapid sequence of brief firings of attitude and divert thrusters, creates longitudinal and rotational accelerations, and thus a very noisy reading for the accelerometers and gyroscopic sensors. For that matter, the proposed design integrates the slewing process and the target acceleration such as to account for those spiky readings in a coherent fashion.

A Kalman Filter has been the preferred control technique used for the last decades. The Kalman filter works well when the different components of the dynamic noise and of measurement noise are well known and well modeled.

In this particular case, regarding the measurement noise, one must understand that the dynamic measurement noise is affected by angular accelerations created by the on-off firing of attitude thrusters that create spiky angular missile body accelerations, creating at the level of the seeker a wide-band noise. The seeker slewing is designed to be very fast, but one can anticipate nonetheless that the seeker readings will be contaminated by some of the residual noise. The dynamic measurement noise creates a number of problems:

1. This is a noise that occurs mostly when thrusters are fired. Since the thruster firing is on-off the amplitude of this noise will be either maximum, or null. This type of noise differs significantly from the basic Kalman Filter assumption that the noise is constant and is governed by Gaussian distribution.
2. This noise is also unfortunately correlated to some of the state variables used in the Kalman filter which complicates the design of the filter. Some special formulations of the Kalman Filter allow handling the case where dynamic noise and measurement noise are correlated, but the formulation of the filter is much more complicated. Moreover the disturbing effects of each thruster must be taken into account separately increases considerably the complexity of the filter.
3. The development of good dynamic model of target maneuver is difficult, in particular in the exo-atmospheric domain when targets engage in voluntary and involuntary maneuvers and include multiple causes of uncertainty and noises not necessarily Gaussian.

The present invention includes a seeker subsystem for integrated seeker slewing and target estimation. The seeker subsystem includes a Higher Order Sliding Mode observer based on a noise and uncertainty bound that does not include and does not require detailed dynamic state models and noise models and thereby circumvents much of the difficulty discussed above.

The first element of the method is the design of an estimator that will estimate the bore-sight error and the target relative and absolute motion perpendicular to the bore-sight. Additional related background material may be found in works by Shtessel, Shkolnikov and Levant in Ref 12, Levant in Ref 13. The second element is the steering of the platform such as to have the center of the spot representing the target in the focal plane array continuously in the centre thereof.

Design of the estimator:

Let us assume that $\bar{\epsilon}_{(.)}, \bar{\Omega}_{(.)}, \bar{a}_{(.)};(.);az,el$ respectively the bore-sight error $(\epsilon,\mu)$ in $(610,611)$ FIG. 6A, the components along bore-sight axes y-Bore, z-Bore of the rotation rate of the bore-sight and measured acceleration. A fourth order sliding mode observer is used to estimate target relative velocity orthogonal to boresight and target acceleration perpendicular to boresight in the presence to disturbing attitude motion of said interceptor body without the need for explicit accurate representation of said disturbing effects. This estimation is achieved by $$\begin{cases} \hat{\varepsilon}_{(.)} = v_{0(.)}; (.) = \text{pitch, yaw}; \varepsilon_{(.)} = \text{normal/transversal} \\ \text{target } pos \ w/r \ \text{boresight} \\ v_{0(.)} = -5L^{1/5}|\varepsilon_{(.)} - \bar{\varepsilon}|^{4/5}\text{sign}(\hat{\varepsilon}_{(.)} - \bar{\varepsilon}_{(.)}) + \hat{V}_{\perp(.)} - \bar{\Omega}_{(.)}r, \\ \hat{\dot{V}}_{\perp(.)} = v_{1(.)}, \\ v_{1(.)} = -3L^{1/4}|\hat{V}_{\perp(.)} - \bar{\Omega}_{(.)}r - v_{0(.)}|^{3/4}\text{sign}(\hat{V}_{\perp(.)} - \\ \bar{\Omega}_{(.)}r - v_{0(.)}) + \hat{a}_{(.)}^T - \bar{a}_{(.)}^M, \\ \hat{\dot{a}}_{(.)}^T = v_{2(.)} \\ v_{2(.)} = -2L^{1/3}|\hat{a}_{(.)}^T - \bar{a}_{(.)}^M - v_{1(.)}|^{2/3}\text{sign}(\hat{a}_{(.)}^T - \bar{a}_{(.)}^M - v_{1(.)}) + z_{3(.)} \\ \dot{z}_{3(.)} = v_{3(.)} \\ v_{3(.)} = -1.5L^{1/2}|z_{3(.)} - v_{2(.)}|^{1/2}\text{sign}(z_{3(.)} - v_{2(.)}) + z_4 \\ \dot{z}_{4(.)} = v_{4(.)}, \\ v_{4(.)} = -1.1L \ \text{sign}(z_{4(.)} - v_{3(.)}) \end{cases} \quad (13)$$

In the formulation above interception motion is represented by interceptor measured body rate $\bar{\Omega}_{(.)};(.)=y, z$ seeker axes, interceptor measured acceleration $\bar{a}_{(.)}^M$;

$(.)=y, z$ seeker both of which may differ from actual values and without need for corresponding dynamical state model.

The Lipshitz constant L must bound $\phi^{(4)}$ the $4^{th}$ derivative of the disturbing term, that is $|\phi^{(4)}| \leq L$. The outputs of the estimator are $\hat{\epsilon}_{(.)}$ the azimuth and elevation components of the bore-sight error, $\hat{V}_{\perp(.)}$ represents the components of target relative acceleration perpendicular to bore-sight; $\hat{a}_{(.)}^T$ represent the components of target acceleration perpendicular to bore-sight. The difference $\hat{\epsilon}_{(.)} - \bar{\epsilon}$ between measured and estimated bore-sight errors indicates how well the estimation converges. We must note that unlike Kalman Filter asymptotic convergence here the difference goes literally to zero in finite time. Since in this case we have a measurement noise, we expect the residual difference to be significantly under the noise level.

Design of the controller slewing the bore-sight line:

The bore-sight line is steered by applying torques on the platform or the mirror. The mirror dynamics is governed by second order model with a moment of inertia, a dampening term, a spring term and an applied torque. Assuming that the inertial term is small compared to the other terms, we have a transfer function $$\Omega = \begin{bmatrix} \varsigma \\ \upsilon \end{bmatrix} = 4000 \frac{w_{[.]}}{\left(\frac{s}{\omega} + 1\right)}; \quad (14)$$

$[.] = (el, az), (\varsigma = \text{pitch}), (\upsilon = \text{yaw});$ $\omega = 250 \text{ rad/sec}$ We assume that the control is achieved by applying elevation and azimuth angular accelerations $\varsigma,\upsilon$. Since our controls are on-off, we introduce an integration, which makes the magnitude of the torques $w_{(.)}$ to increase linearly with the duration of the pulse. If we denote the control signals $u_{(.)}$ we have $$\begin{bmatrix} \varsigma \\ \upsilon \end{bmatrix} = 4000 \frac{u_{[.]}*(1+d)}{s\left(\frac{s}{\omega}+1\right)};\quad (15)$$

[.] = (el, az), (ς = pitch), (υ = yaw);

ω = 250 rad/s

We also assume the existence of random Gaussian multiplicative disturbances, set in the simulations at 1% of the nominal values of the torques. The sliding variable is defined as $\sigma_{(.)} = \hat{\epsilon}_{(.)}$.

Figure 6B:
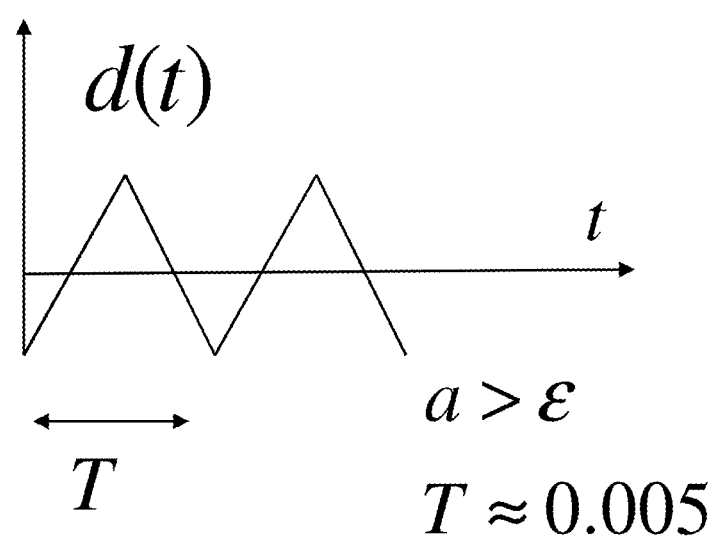
FIG. 6B illustrates an exemplary dither signal applied to the Pulse Width Modulation.

The Nonlinear Filter with Pulse Width Modulation controller is designed directly as $$\begin{cases} \dot{\chi}_{(.)} = \xi_{(.)}|\sigma_{(.)}|^{0.5}\text{sign}(\sigma_{(.)}) - \eta_{(.)}|J_{(.)}|^{0.5}\text{sign}(J_{(.)}); (.) = p, q, r \\ J_{(.)} = \chi_{(.)} + \sigma_{(.)}; \\ u_{[.]} = F_{(.)}(J_{(.)}, d_{(.)}(t)); [.] = l, m, n \end{cases} \quad (16A)$$

Where $$F_{(.)}(J_{(.)}, d_{(.)}(t)) = \begin{cases} -\rho_{(.)0} & \text{if } J + d(t) > \varepsilon \\ 0 & \text{if } |J + d(t)| \le \varepsilon \\ \rho_{(.)0} & \text{if } J + d(t) < \varepsilon \end{cases} \quad (16B)$$

Where the dither signal d(t) is represented in FIG. 6B. where for the exemplary simulated case, the gains are set to $$\xi_{(.)} = \begin{cases} 8 & \text{if } t < 20 \text{ sec} \\ 28 & \text{if } t \ge 20 \text{ sec} \end{cases}; \quad (.) = \text{azimuth, elevation} \quad (17)$$

$$\eta_{(.)} = 125$$

Figure 7:
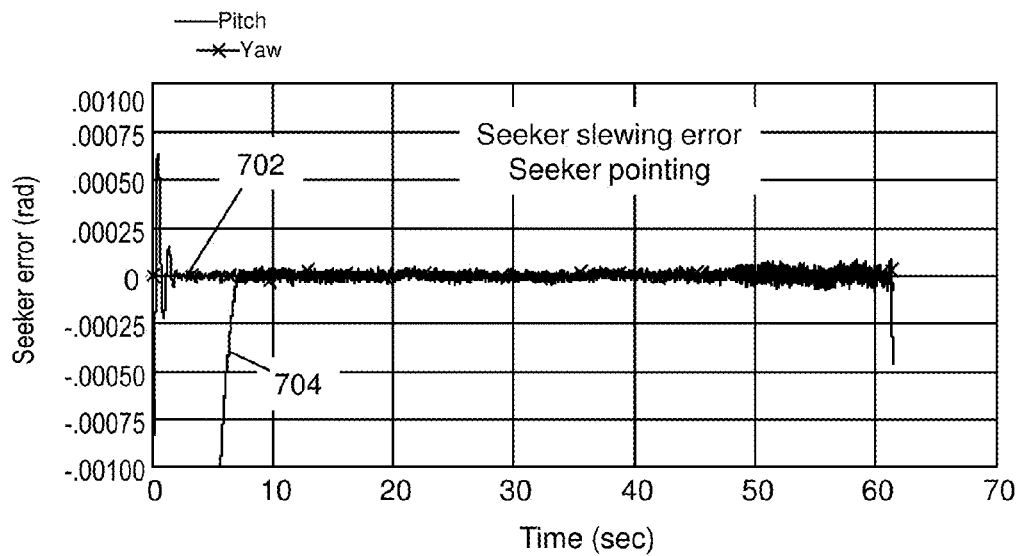
FIG. 7 represents exemplary azimuth bore-sight pointing error for a simulated seeker subsystem in accordance with FIG. 6A.

FIG. 7 shows pitch 704 and yaw 702 seeker slewing error for a simulated flight. Note that the controller achieves well its objective of driving the bore-sight error into the measurement noise level as shown in FIG. 7. During initial part of the interception the estimated (704) and actual slewing errors in azimuth is about 20 micro rad, it increases during the KV segment to 40 micro radians.

Figure 8:
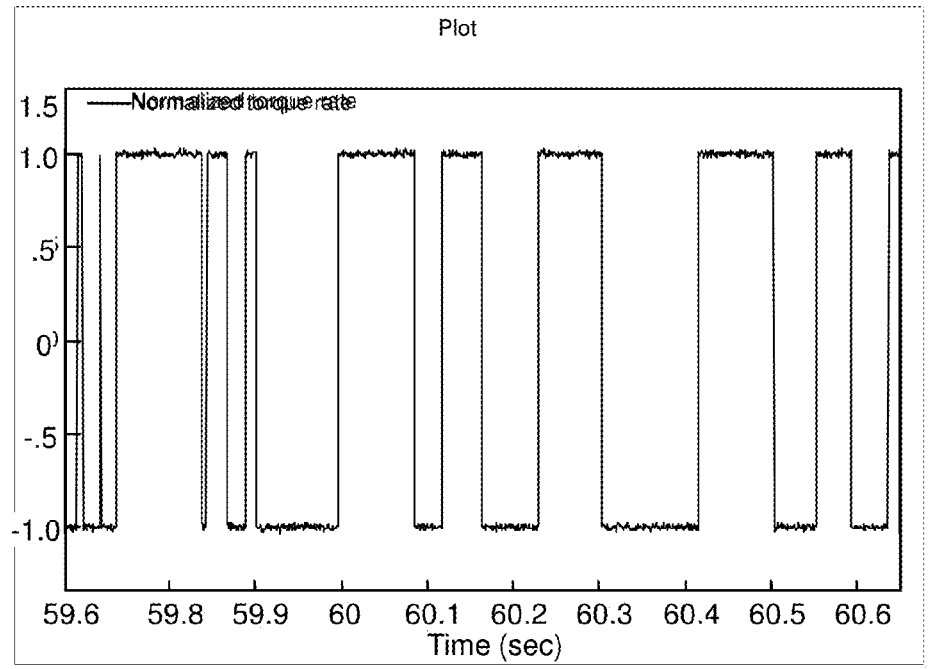
FIG. 8 represents exemplary pulse width modulated torques applied to the intermediate mirror of FIG. 6A.

FIG. 8 shows seeker torque 802 driving the seeker moving mirror for a portion of the simulated flight of FIG. 7. One can appreciate in FIG. 8 that due to the large disturbance level introduced, the amplitude of the torque varies significantly, during the pulse. One can only note that the pulse widths vary due to the PWM.

Figure 9:
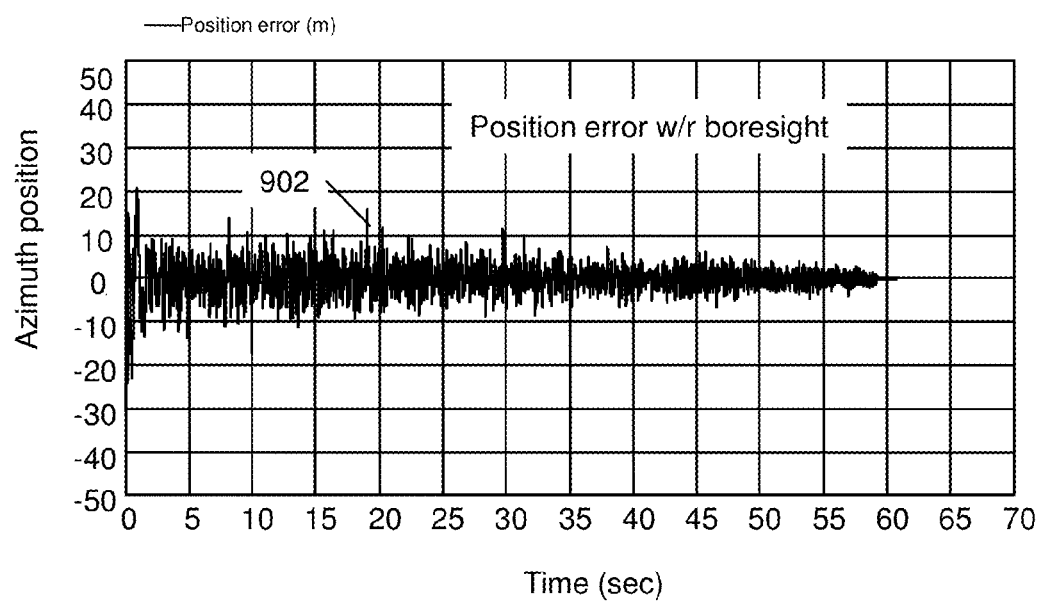
FIG. 9 represents the target lateral distance with respect to bore-sight.

FIG. 9 shows the exemplary simulated tracking performance of target estimated and actual relative position error 902 with respect to bore-sight in the horizontal plane, with pointing errors less than 5 m at the beginning of the interception and decreasing linearly function of the range.

Figure 10A:
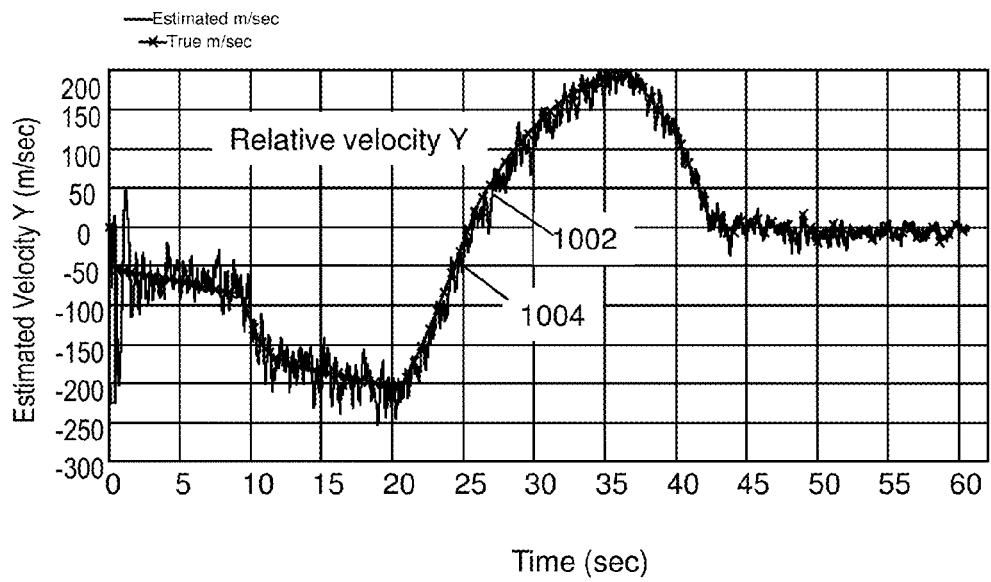
FIGS. 10(a) and 10(b) represents the tracking performance of target normal relative velocity.
Figure 10B:
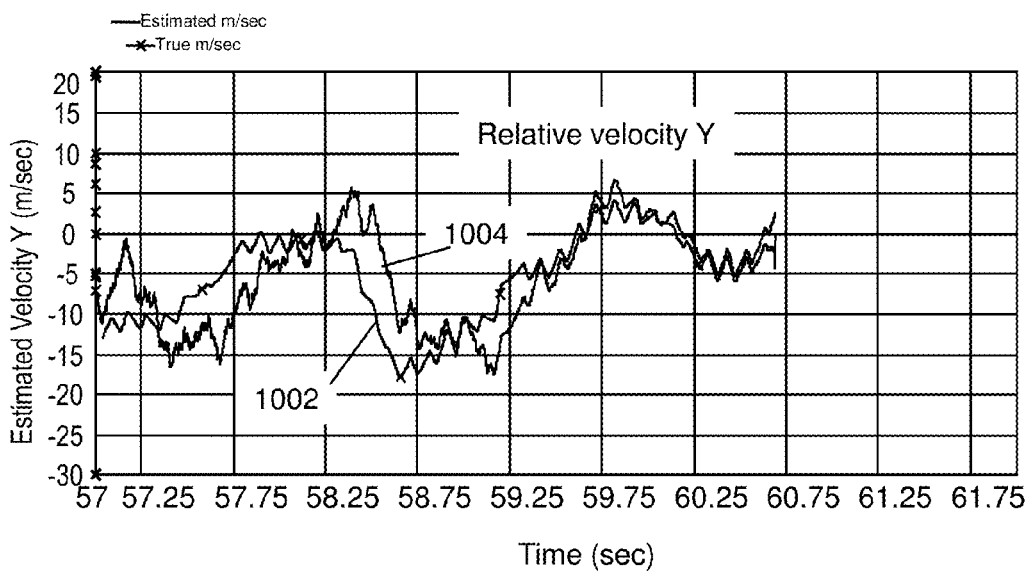

FIG. 10A and FIG. 10B show the comparison of target true 1002 and $\hat{V}_{\perp y}$ estimated 1004 velocity with respect to bore-sight for the exemplary simulated case. One can note that after the transient response during the 5 first seconds, the HOSM estimation $\hat{V}_{\perp y}$ 1004 follows well the true 1002 values. One also can note that the values of the target relative velocity are large until time=42, where the missile reaches the collision condition. From time=50 sec to the end, one can note that the simulated target engages in sinusoidal maneuvers. One can note on the zoomed portion FIG. 10B that notwithstanding target rapid maneuvers, the estimator tracks well the relative velocity with velocity errors of few meters/sec.

Figure 11:
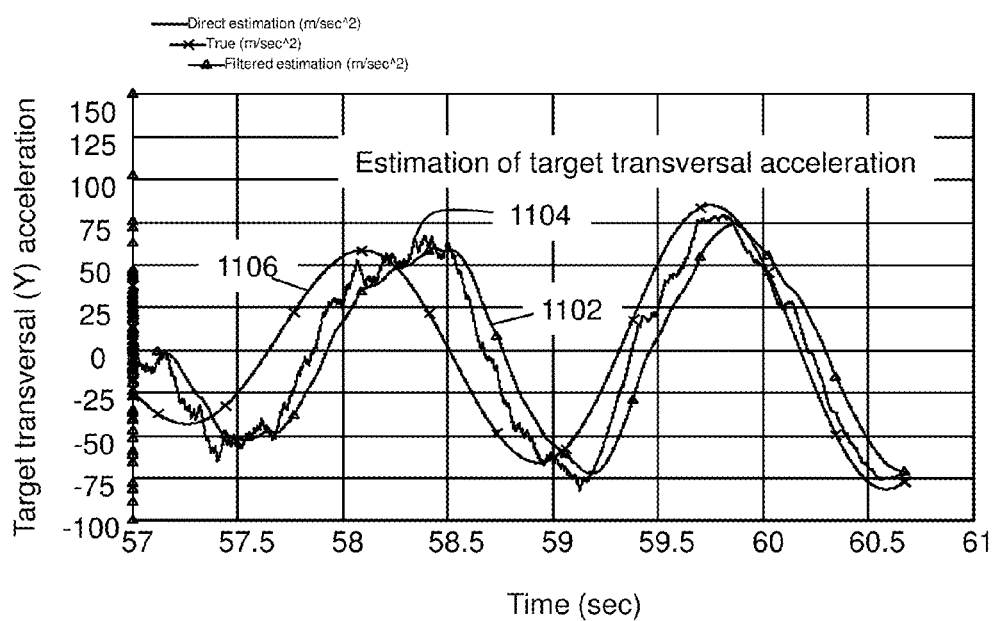
FIG. 11 represents the tracking performance of target normal acceleration.

FIG. 11 shows the simulated estimation of target transversal acceleration. The estimator performs well again regarding tracking of target transversal acceleration $\hat{a}_Y^T$ 1102 where estimated acceleration signal 1104 is passed by a second order low pass filter 1106 with a characteristic frequency of 25 rad/sec. The total lag is about 100 microseconds.

Third Embodiment

The third embodiment is HOSM guidance. Guidance is the process that provides acceleration commands to the autopilot process.

The guidance process begins by generating a guidance strategy. The guidance strategy defines the sensor inputs, control outputs and the objectives for each of one or more phases of intercept. One exemplary guidance strategy may endeavor to minimize a line of sight rate. Another guidance strategy may endeavor to minimize time to intercept. Still another guidance strategy may minimize control effort. Any guidance strategy may be used with the present invention. In accordance with one embodiment of the present invention, a sliding surface for a high order sliding mode control is established to enforce the selected guidance strategy. Upon initiation, the guidance controller drives the system to the simultaneous sliding condition for the sliding surface and one or more derivatives of the sliding surface, whereupon the simultaneous sliding condition is maintained until intercept, thereby maintaining the guidance strategy until intercept.

In one embodiment, the guidance strategy is to achieve and maintain a collision condition. A collision condition is the set of interceptor and target position and velocity states that, without further maneuver, will result in a collision intercept. It is desired to establish a collision condition and thereafter to maintain the collision condition in the presence of disturbances. The disturbances may include target maneuvers and system measurement errors and noises. In one embodiment of the invention, system modeling errors resulting from simplification of system design models and control algorithms are included in the total system disturbance budget. A high order (second order or higher) sliding mode control law is selected that achieves the high order sliding condition in finite time, i.e., before intercept, in the presence of disturbances less than a Lipschitz bound in accordance with the system disturbance budget.

By doing so the guidance strategy reduces the interceptor maneuver advantage, i.e., minimizes the ratio of interceptor acceleration perpendicular to the bore-sight line over corresponding target acceleration. As once the collision condition is achieved, then for sustaining of the collision condition, the interceptor only needs to "mimic" target acceleration, that is with a maneuver advantage barely over one. This guidance strategy is especially desirable for re-entry intercepts. When re-entry target maneuvers are considered, target maneuverability peaks at the end (lowest altitude for the target), while at this stage interceptor maneuverability is minimum (highest altitude for the interceptor).

Figure 12:
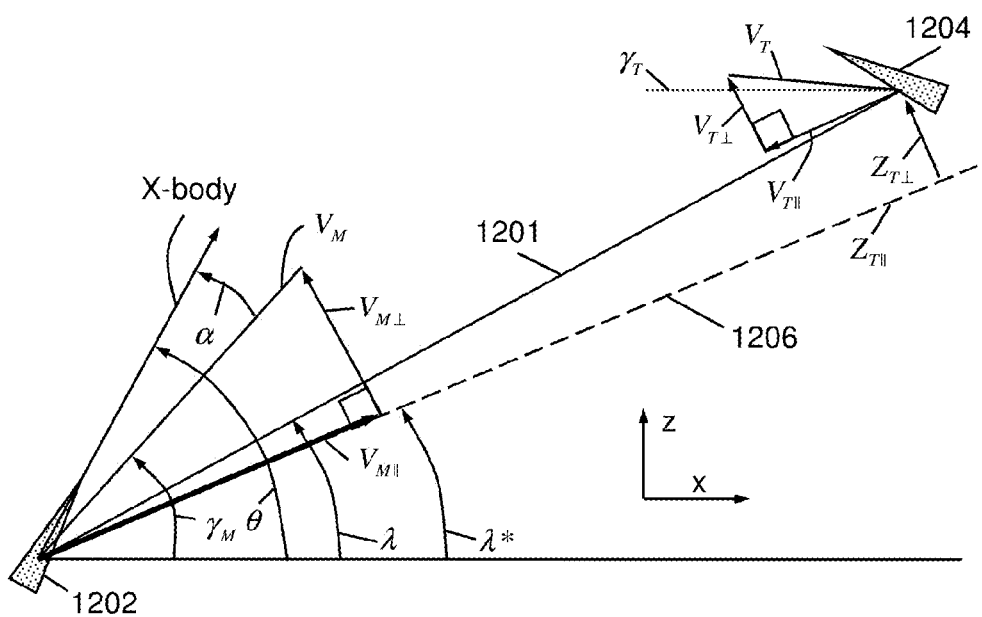
FIG. 12 represents the interception geometry in the vertical plane.

FIG. 12 represents interception geometry in the vertical plane. A similar figure could be easily drawn in the horizontal plane. When target 1204 and interceptor 1202 velocities are constant, the collision condition may be written as $$\frac{x \cdot v_y - y \cdot v_x}{x^2 + y^2} = \dot{\lambda} = 0; \quad \dot{r} < 0 \quad (18)$$

where x, y are the horizontal and vertical interceptor to target and $v_x, v_y$ relative velocities along x and y axes. If the bore-sight frame is not rotating $\dot{\lambda}^*=0$ the collision condition is $Z_{T_\perp}=0$, if the bore-sight frame 1206 is rotating the we have $$\dot{\lambda}* = \frac{rV_\perp - V_\parallel Z_\perp}{r^2} \tag{19}$$

where r is the range; in this case $Z_{T_\perp} + V_\perp tgo = 0$
The Proportional Navigation requires the normal acceleration to be $$\Gamma_\perp^M = -NV_\parallel \dot{\lambda}; N=3-5 \tag{20}$$

If the guidance is not initiated in collision, collision condition will only occur at the end, missile will be maneuvering continuously and the acceleration will peak at the end. A variant of PN is Augmented Proportional Navigation, where the control Eq. (20) is augmented with estimated value of target acceleration perpendicular to LOS as $$\Gamma_\perp^M = -N_{V_\parallel}\dot{\lambda} + \frac{N}{2}\hat{\Gamma}_\perp^T; N = 3-5 \tag{21}$$

Both PN and APN formulations require missile constant longitudinal velocity, and assume a perfect response of the interceptor. We have also the Zero Effort Miss formulation using the time to go, tgo $$\Gamma_\perp^M = \frac{N}{tgo^2}(Z_{T_\perp} + V_\perp tgo) + \frac{N}{2}\hat{\Gamma}_\perp^T \tag{22}$$

Here the accuracy of the formulation requires tgo to be accurate and a perfect response of the interceptor. Proportional Navigation and APN are known to yield reasonable miss-distance against non-maneuvering and moderately maneuvering targets.

The method proposed here, acknowledges that the variation of longitudinal velocity and of target acceleration have adverse effects on PN and APN guidance, but instead of trying to compensate explicitly for such effects with a compensation that is only as good as the estimation of said effects as most methods described above do; it takes advantage of the insensitivity of HOSM to matched disturbance, to compensate implicitly for said effects. In accordance with the present invention, the guidance strategy is defined as:

$$Z_{T_\perp}\omega + V_\perp = 0; \omega = 1/t_{reach}; t_{reach} < tgo \tag{23}$$

Designed, when $Z_{T_\perp} \neq 0$ to drive $Z_{T_\perp}$ to zero first, and for maintaining collision condition thereafter. For that matter we define the guidance strategy:

$$\begin{cases} \sigma_{(.)} = \omega Z_{T_{\perp(.)}} + V_{\perp(.)}; (.) = \text{normal}(Z), \text{perpendicular}(Y) \\ \omega = \frac{1}{tgo_{min}} \text{ if } tgo < tgo_{min} \\ \omega = \frac{1}{tgo_{max}} \text{ if } tgo > tgo_{max} \\ \omega = \frac{1}{tgo} \text{ if } tgo_{min} \leq tgo \leq tgo_{max} \end{cases} \tag{24}$$

where $\sigma_{(.)}$ is defined as a "sliding variable." A Second Order Sliding Mode Controller (SSOMC) control law is used to drive $\sigma_{(.)}, \dot{\sigma}_{(.)} \to 0$ and thereby drive sliding variable to the sliding surface and thus set the missile, into collision condition in finite time and in the presence of unknown bounded disturbance, and where $V_{\perp(.)}$ and $Z_{T_{\perp(.)}}$ respectively target relative velocity and position with respect to boresight $tgo_{max}$ and $tgo_{min}$ are chosen such as to achieve desired reaching time to the collision time and such as to avoid excessive gains close to the origin.

With this choice of surfaces, we force the missile into collision early in the game and at the end of the end game we avoid the singularity of Eq. (24) when $tgo \to 0$. In the intermediate regime, we adjust $\omega$ to the current value of tgo.

In one aspect of this third embodiment, we use a HOSM formulation to drive $\sigma_{(.)}, \dot{\sigma}_{(.)} \to 0$ in finite time, i.e., before intercept.

Thus, we represent the dynamics of the system as $$\dot{\sigma} = f(t) + u, \sigma \in \Re^1 \tag{25}$$

Where u represents commanded lateral acceleration and unknown, bounded disturbing term f(t) represents all other dynamical effects; which can be separated into target acceleration and other terms as:

$$f(t) - \Gamma_{\perp(.)}^T + \eta_{(.)} = \tag{26}$$

$$\begin{cases} \Gamma_{\perp(.)}^T + \frac{V_{\perp(.)}}{tgo_{min}} - V_\parallel \dot{\lambda} & \text{if } tgo < tgo_{min} \\ \Gamma_{\perp(.)}^T + \frac{Z_{T_{\perp(.)}}}{tgo^2} + \frac{V_{\perp(.)}}{tgo} - V_\parallel \dot{\lambda} & \text{if } tgo_{min} \leq tgo \leq tgo_{max} \\ \Gamma_{\perp(.)}^T + \frac{V_{\perp(.)}}{tgo_{max}} + \frac{V_{\perp(.)}}{tgo} - V_\parallel \dot{\lambda} & \text{if } tgo > tgo_{max} \end{cases}$$

where $\eta_{(.)}$ represents the terms other than target acceleration that will be compensated explicitly. Here we have the choice of using Target acceleration $\hat{\Gamma}1_{\perp(.)}^T$ estimated by the seeker as discussed previously or $\hat{\Gamma}2_{\perp(.)}^T$ calculated by an observer embedded with guidance which not only estimates target acceleration but effects of disturbance terms such as errors in terms $V_{\perp(.)}$, tgo and $V_\parallel \dot{\lambda}$. The smooth control u that drives $\sigma, \dot{\sigma} \to 0$ (smooth second order sliding mode) in finite time:

$$\begin{cases} u_{(.)} = \hat{\Gamma}_{\perp(.)}^T + \hat{\eta}_{(.)} - \alpha_1 |\sigma_{(.)}|^{2/3} \text{sign}(\sigma_{(.)}) + w \\ \dot{w} = -\alpha_2 |\sigma_{(.)}|^{1/3} \text{sign}(\sigma_{(.)}); \quad (.) = \text{normal}(Z), \text{transversal}(Y) \end{cases} \tag{27}$$

$$\hat{\Gamma}_{\perp(.)}^T = sel(\hat{\Gamma}1_{\perp(.)}^T, \hat{\Gamma}2_{\perp(.)}^T)$$

The estimation of target acceleration $\hat{\Gamma}2_{\perp(.)}^T$ may be achieved by a smooth observer:

$$\begin{cases} \dot{z}_0 = v_0 + u \\ v_0 = -2L^{1/3}|z_0 - \sigma|^{2/3}\text{sign}(z_0 - \sigma) + z_1 \\ \dot{z}_1 = v_1 \\ v_1 = -1.5L^{1/2}|z_1 - v_0|^{1/2}\text{sign}(z_1 - v_0) + z_2 \\ \dot{z}_2 = -1.1L\text{sign}(z_2 - v_1) \\ z_1 \to \Gamma2_{\perp(.)}^T \text{ in finite time} \end{cases} \tag{28}$$

Here the target estimation by the seeker $\hat{\Gamma}1_{\perp(.)}^T$ is matches better actual target acceleration $\hat{\Gamma}_{\perp(.)}^T$. Conversely the term $\hat{\Gamma}2_{\perp(.)}^T$ calculated by the estimator estimates not only $\hat{\Gamma}_{\perp(.)}^T$, but the errors in the estimation of $\tilde{\eta}_{(.)} = \hat{\eta}_{(.)} - \eta_{(.)}$ and other disturbance in Eq. (25). The gains achieved by selecting $\hat{\Gamma}2_{\perp(.)}^T$ over $\hat{\Gamma}1_{\perp(.)}^T$ are few percent better scores against 0.3 and 0.5 miss-distances. Here what is important is to compensate for all disturbing terms which target acceleration is only part of.

In this example L=1000. When on-off thrusters are used, their command is derived from the continuous and smooth control u.

With $$v_{(.)} = \text{deadBand}[\text{sign}(u_{(.)}) + a\sin(\overline{\omega}t), b] \quad (29)$$

$$\hat{\eta}_{(.)} = \begin{cases} \dfrac{\hat{V}_{\perp(.)}}{tgo_{min}} - \hat{V}_\| \hat{\lambda} & \text{if } tgo < tgo_{min} \\ \dfrac{\hat{Z}_{T\perp(.)}}{tgo^2} + \dfrac{\hat{V}_{\perp(.)}}{tgo} - \hat{V}_\| \hat{\lambda} & \text{if } tgo_{min} \le tgo \le tgo_{max} \\ \dfrac{\hat{V}_{\perp(.)}}{tgo_{max}} - \hat{V}_\| \hat{\lambda} & \text{if } tgo > tgo_{max} \end{cases} \quad (30)$$

Equation (25) can now be written as $$\dot{\sigma}_{(.)} + a_1|\sigma_{(.)}|^{2/3}\text{sign}(\sigma_{(.)}) + a_2\int|\sigma_{(.)}|^{1/3}\text{sign}(\sigma_{(.)})d\tau = \hat{\Gamma}_{\perp(.)}^T + \tilde{\eta}_{(.)} = g_{(.)} \quad (31)$$

Considering the boundedness of $\dot{g}_{(.)}$ the first term $\dot{\hat{\Gamma}}_{\perp(.)}^T$ is evidently bounded, but this is not necessarily the case of $\dot{\tilde{\eta}}_{(.)}$ as tgo→0. Considering Eq. (25); when tgo<$tgo_{min}$ assuming perfect estimation of target acceleration exact compensation of $\eta_{(.)}$ we have $$\dot{\sigma}_{(.)} = \tilde{\eta}_{(.)}; \tilde{\eta}_{(.)} = \left(\dfrac{1}{tgo_{min}} + \dfrac{1}{tgo}\right)\tilde{V}_{\perp(.)} \quad (32)$$

When tgo→0, $Z_{\perp(.)} \approx 0$; $\sigma_{(.)} \approx V_{\perp(.)}$ if we represent $\hat{V}_{\perp(.)} = (1-\epsilon)V_{\perp(.)}; |\epsilon|<<1$, Eq. (32) after (only) compensating $\hat{\eta}_{(.)}$ becomes $$\dot{\sigma}_{(.)} = \tilde{\eta}_{(.)}; \tilde{\eta}_{(.)} = \left(\dfrac{1}{tgo_{min}} + \dfrac{1}{tgo}\right)\epsilon V_{\perp(.)}, \quad (33)$$

which is mildly unstable if $\epsilon<0$. For that matter a multiplicative factor k is applied before in $\hat{\eta}_{(.)}$ in Eq. (27); one can see that $k-1>|\epsilon|$ guarantees the strict stability. Corresponding control law becomes $$\begin{cases} u_{(.)} = \hat{\Gamma}_{\perp(.)}^T + k\hat{\eta}_{(.)} - \alpha_1|\sigma_{(.)}|^{2/3}\text{sign}(\sigma_{(.)}) + w \\ \dot{w} = -\alpha_2|\sigma_{(.)}|^{1/3}\text{sign}(\sigma_{(.)}); (.) = \text{normal}(Z), \text{transversal}(Y) \end{cases} \quad (34)$$

$$\hat{\Gamma}_{\perp(.)}^T = sel(\hat{\Gamma}2_{\perp(.)}^T, \hat{\Gamma}2_{\perp(.)}^T)$$

The guidance performance is compared to widely used and proven guidance techniques, namely, PN, APN.

Figure 13:
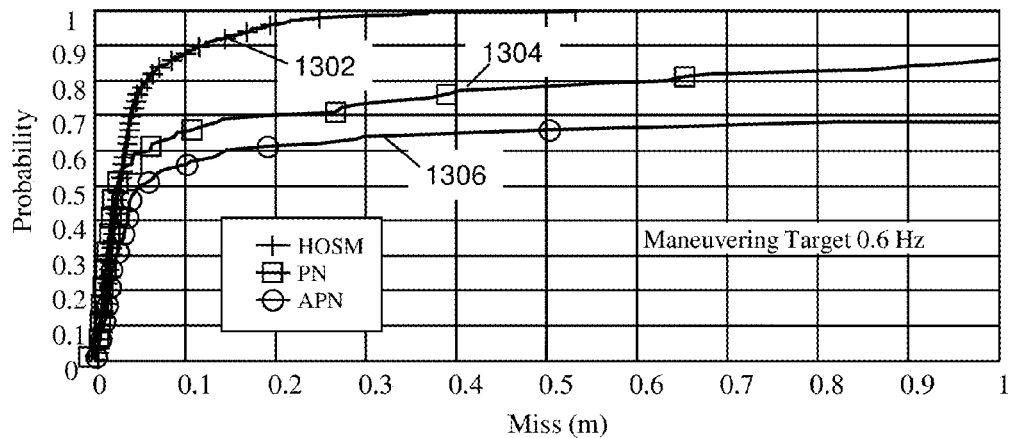
FIG. 13 represents the comparison of HOSM guidance with conventional guidance for target maneuvers at 0.6 Hz.

In the engagement scenario chosen half of the interceptions take place between 20000 and 35000 meters where the target 0.6 Hz sinusoidal maneuvers result in accelerations peak amplitudes in the 50-100 m/sec$^2$. The initial target altitude, flight path angle and azimuth, its ballistic coefficient are randomized, as well as the launch delay. Statistics established with 500 Monte Carlo runs, presented in FIG. 13 show that HOSM guidance 1302 outperforms PN 1304 and APN 1306.

Considering the objective maximum miss-distances of 0.5 m, HOSM guidance achieves the desired result in 99.8% of the cases compared with 78 and 66% for PN and APN. With an objective of 0.3 m, numbers become 98% compared with 74% and 63% respectively.

Figure 14:
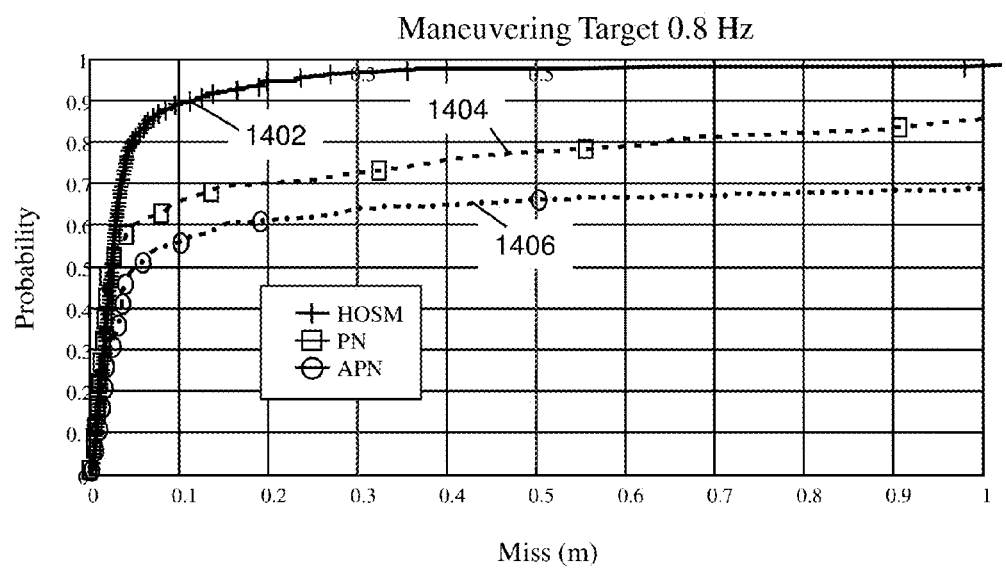
FIG. 14 represents the comparison of HOSM guidance with conventional guidance for target maneuvers at 0.8 Hz.

FIG. 14 is a comparison of simulated target and interceptor accelerations. Referring to FIG. 14, FIG. 14 shows that the interceptor literally "mimics" the target, which means that the interceptor lateral acceleration capability does not outmaneuver the target in order to successfully intercept it. In other terms, HOSM guidance only requires a "maneuver advantage ratio" close to unity. One can note the sinusoidal pattern of the interceptor acceleration 1404 achieved by the attitude maneuver and the acceleration spikes 1402) representing the firing of divert thrusters. The smooth line 1406 represents target acceleration.

When target maneuver frequencies increase beyond 0.8 Hz, in the 1-1.5 Hz we have a situation where the observer lag of embedded observer, Eq. (28) that achieves the smoothness of the control law is about 0.1 sec, is responsible for about 10-30% misses. Considering the interception of rapidly maneuvering targets we use an alternative "Super-Twist" design and the guidance law becomes $$\begin{cases} \dot{z}_0 = v_0 + u \\ \dot{v}_0 = -1.5L^{1/2}|z_0 - \sigma|^{1/2}\text{sign}(z_0 - \sigma) + z_1 \\ \dot{z}_1 = -1.1L\text{sign}(z_1 - v_0) \\ z_1 \to \Gamma 2_{\perp(.)}^T \text{ infinite time} \end{cases} \quad (35)$$

with Lipshitz constant L that bounds $\phi^{(2)}$ the $2^{nd}$ derivative of the disturbing term, that is $|\phi^{(2)}| \le L=10000$. This reduces very significantly the embedded observer lag and allows achieving excellent performance against targets maneuvering in the 1-1.5 Hz range. Considering maneuvers beyond 1.5 Hz, as the metric amplitude of target oscillations decreases as $\Gamma_{max}^T/\omega_T^2$ maneuver amplitudes become then small enough to still constitute significant problem, i.e. at frequencies of 2.5 Hz, the amplitude of the target lateral motion is only 0.45 m. This observer is noisier than previous one, however on average it achieves a better compensating performance.

Figure 15:
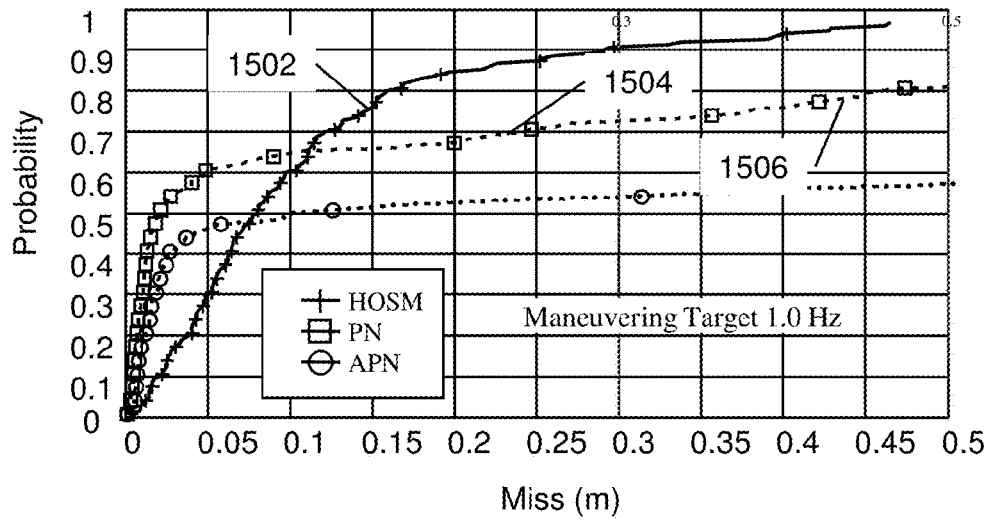
FIG. 15 represents the comparison of HOSM guidance with conventional guidance for target maneuvers at 1.0 Hz.
Figure 16:
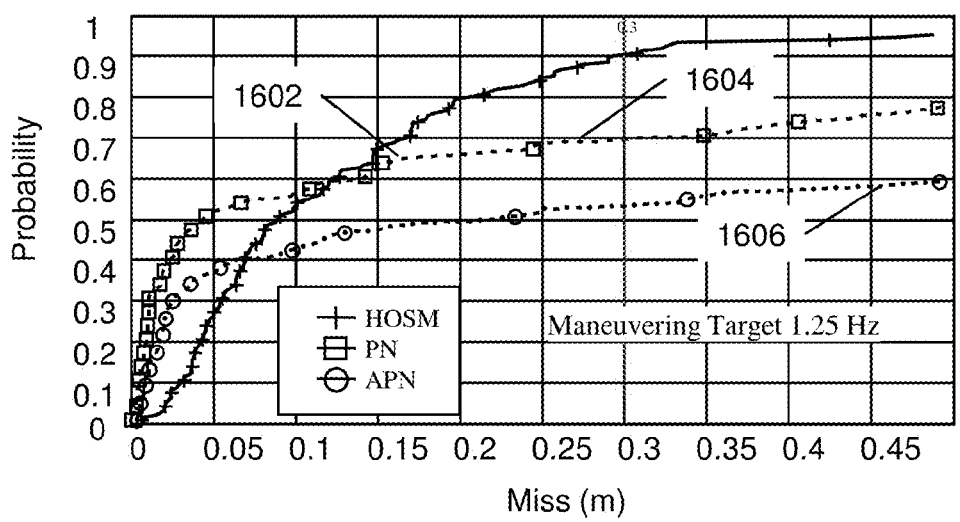
FIG. 16 represents the comparison of HOSM guidance with conventional guidance for target maneuvers at 1.25 Hz.
Figure 17:
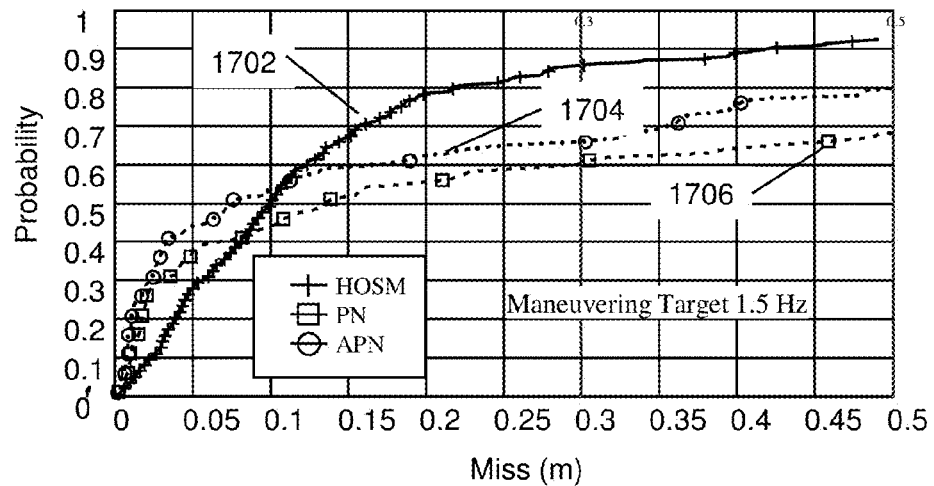
FIG. 17 represents the comparison of HOSM guidance with conventional guidance for target maneuvers at 1.5 Hz.
Figure 18:
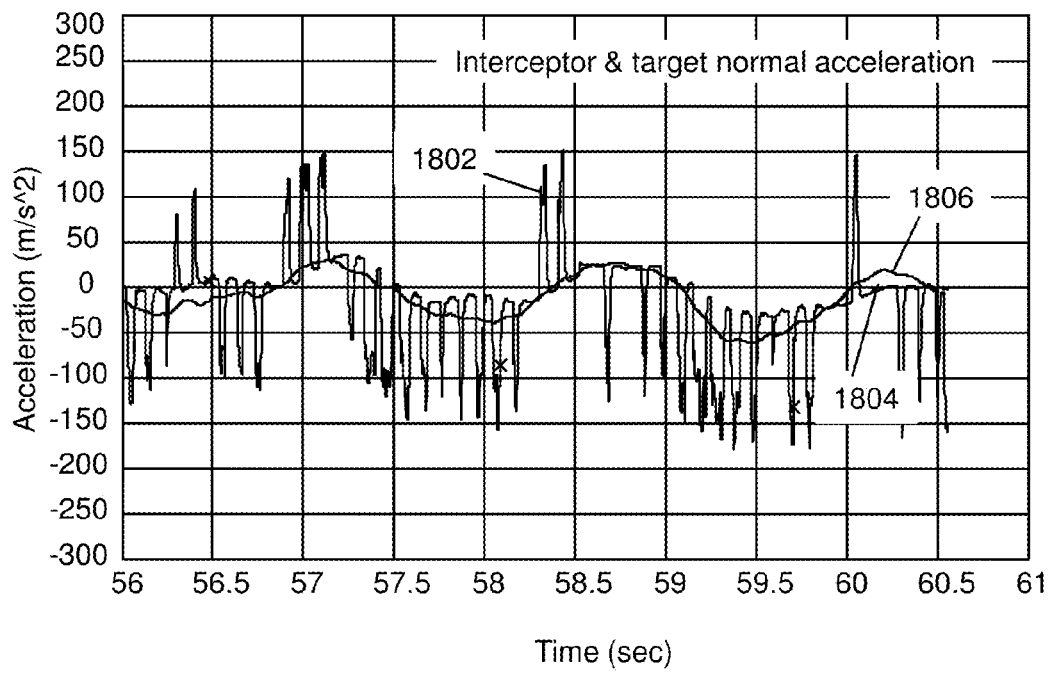
FIG. 18 represents the comparison of target and interceptor accelerations.

Results FIG. 15, FIG. 16, FIG. 17 show that with maneuvers frequencies 1, 1.25, 1.5 Hz, HOSM miss-distance cumulative distributions 1502, 1602, 1702 outperform traditional guidance laws represented by 1504-1506, 1604-1606, 1704-1706 by 20-40% probability. Conversely the usage of this shorter-lag unsmooth "Super-Twist" observer causes some degradation in the distribution of small miss-distances <0.15 as shown by comparison of curves 1302-1402 obtained with the smooth observe Eq. (28) against target maneuvers at 0.6-0.8 Hz compared with curves 1502-1602-1707 obtained using the "Super-Twist" observer against targets maneuvering at 1-1.25-1.5 Hz.

Fourth Embodiment

The fourth embodiment is HOSM quaternion autopilot. Here the autopilot typically needs to steer the missile attitude to achieve some desired lateral acceleration. Alternatively, attitude may be directly commanded. Commanded attitude may be a directly commanded attitude such as at launch and shortly thereafter or before impact, or such as to enhance collision effectiveness as this could be done after interceptor booster burn-out and when dynamic pressure is small enough. Commanded attitude may be calculated in the autopilot subsystem such to achieve some prescribed lateral acceleration calculated by the guidance. Said prescribed lateral acceleration may the primary acceleration command, as this may be the case with an interceptor which divert is solely achieved by aerodynamic lift, orientation of main booster/sustainer body orientation or combination thereof or may be the secondary cooperative disturbance acceleration.

The relation of the autopilot with other elements of architecture in the present invention can be better understood by examining FIG. 5. The first step of the method is the calculation in the attitude command block 506 of prescribed body attitude represented by a quaternion and the corresponding commanded body attitude rate 518. The second step comprises calculating in the block automatic pilot 508 the three sliding variables, and thereafter the calculation by the HOSM autopilot actuator commands 520 required to driving the three surfaces to zero.

In the first step, commanded acceleration from the HOSM guidance are used to calculate the desired angles of attack, in the pitch and yaw planes, taking into consideration the aerodynamic lift gradient and the thrust using $$\alpha_{(.)} = \frac{\Gamma_{\perp(.)}^T}{\cos(\kappa_{[.]}) \left( \frac{0.7 pres M^2 SCL_\alpha}{m} + \frac{F}{m}\cos(\alpha_{(.)}) \right)} \quad (36)$$

$(.) = $ pitch, yaw; $[.] = $ elevation, azimuth

The $\cos(\alpha)$ in the denominator, that takes into account that the aerodynamic lift is calculated iteratively.

The pitch and yaw lead angles are calculated as follows. First we calculate the LOS frame. Its first vector $I_x$ is the bore-sight direction and the two other axes are calculated by $$I_y = \frac{I_x \times rI}{|I_x \times rI|} \quad (37)$$

$$I_z = \frac{I_x \times I_y}{|I_x \times I_y|}$$

Where rI is the local vertical unit-vector. Then, the velocity frame is calculated with the first vector $J_x$ in the direction of the interceptor relative velocity vector and two other axes calculated by:

$$J_y = \frac{J_x \times rI}{|J_x \times rI|} \quad (38)$$

$$J_z = \frac{J_x \times J_y}{|J_x \times J_y|}$$

And we have $$\kappa_{az} = \mathrm{acos}(J_y I_y); \kappa_{El} = \mathrm{acos}\left(J_z \frac{rI}{|rI|}\right) - \mathrm{acos}\left(I_z \frac{rI}{|rI|}\right) \quad (39)$$

This formulation is exactly the same regardless of the reference chosen provided that vectors rI, $J_x$ are expressed in the selected reference frame. The quaternion may be defined relative to a variety of references such as for example, ECI, NED and a variety of other references provided that commanded and actual references are the same.

The transformation matrix represented desired body attitude is calculated using rotation matrices defined as follows $$T(\varphi, e) = \begin{bmatrix} \cos(\varphi) + (1-\cos(\varphi))e_1 e_1 & (1-\cos(\varphi)e_1 e_2 + \sin(\varphi)e_3 & (1-\cos(\varphi)e_1 e_3 - \sin(\varphi)e_2 \\ (1-\cos(\varphi)e_1 e_2 - \sin(\varphi)e_3 & \cos(\varphi) + (1-\cos(\varphi))e_2 e_2 & (1-\cos(\varphi)e_3 e_2 + \sin(\varphi)e_1 \\ (1-\cos(\varphi)e_1 e_3 - \sin(\varphi)e_2 & (1-\cos(\varphi)e_3 e_2 - \sin(\varphi)e_1 & \cos(\varphi) + (1-\cos(\varphi))e_3 e_3 \end{bmatrix} \quad (40)$$

The axes of the required body attitude are obtained by a first rotation of $\alpha_{yaw}$ around $J_z$. We obtain intermediate axes:

$$J2_x = T[\alpha_{yaw}, J_z] J_x; J2_y = T[\alpha_{yaw}, J_z] J_y \quad (41)$$

Followed by a rotation $\alpha_{yaw}$ around $J2_y$, $$JB_x = T[\alpha_{pitch}, J2_y] J2_x; JB_y = T[\alpha_{pitch}, J2_y] J2_y; \\ JB_z = JB_x \times JB_y. \quad (42)$$

The matrix $$T_{ECI}^{body} = [\, JB_x \quad JB_y \quad JB_z \,]$$

formed by the three body axes column vectors represent the transformation from body to ECI. (Note we could have used any other reference instead, such as NED) Corresponding quaternion is then calculated using the following formulae. Given a transformation matrix R the corresponding quaternion first, scalar parameter $q_0$ is calculated as in Ref. 17 as:

$$4q^{02} = 1 + R_{1,1} + R_{2,2} + R_{3,3} \quad (43)$$

and the three vector parameters:

$$\begin{cases} q_1 = \dfrac{R_{2,3} - R_{3,2}}{4q_0} \\ q_2 = \dfrac{R_{3,1} - R_{1,3}}{4q_0} \\ q_3 = \dfrac{R_{1,2} - R_{2,1}}{4q_0} \end{cases} \quad (44)$$

This can also be written as:

$$Q = \begin{bmatrix} \cos(\phi/2) \\ \sin(\phi/2)_{e_1} \\ \sin(\phi/2)_{e_2} \\ \sin(\phi/2)_{e_3} \end{bmatrix} \quad (45)$$

This formulation of the quaternion may unfortunately become singular when $q_0$ approaches zero. The rotation becomes a simple reflection and the vector e becomes undefined. The approach for overcoming this difficulty is to assume that the quaternion representing the rotation is now $q_1$, $q_2$ or $q_3$ and to calculate them choosing one of the four possible formulations of Eq. (44) and Eq. (45) in Ref [17]. It should be noted that the problem seemingly posed by the initiation of a quaternion using a rotation/transformation matrix is solved by the iteration of the calculation. Once the initial quaternion has been calculated it suffices to update the quaternion and it does not matter anymore whether $\cos(\Phi/2)$ becomes zero thereafter.

Prescribed roll, pitch and yaw rates can be defined from the time derivative of the prescribed quaternion as $$\Omega^* = \begin{bmatrix} p^* \\ q^* \\ r^* \end{bmatrix} = 2 \begin{bmatrix} -q_1 & q_0 & q_3 & -q_2 \\ -q_2 & -q_3 & q_0 & q_1 \\ -q_3 & q_2 & -q_1 & q_0 \end{bmatrix} \begin{bmatrix} \dot{q}_0 \\ \dot{q}_1 \\ \dot{q}_2 \\ \dot{q}_3 \end{bmatrix}; Q^*_{body/(.)} = \begin{bmatrix} q_0 \\ q_1 \\ q_2 \\ q_3 \end{bmatrix} \quad (46)$$

Alternatively we can calculate prescribed attitude rate wherein the quaternion attitude rate errors in 4 component quaternion space errors $(\dot{Q}^*_{body/(.)} - \dot{Q}_{body/(.)})$ are mapped to 3 component body axes, wherein prescribed body rate errors are derived from the time derivative $\dot{T}^*_{body/(.)}$ of transformation matrix $T^*_{body/(.)}$ that represents prescribed attitude with respect to chosen reference. The prescribed attitude rate is:

$$\Omega^* \times_{body} = \begin{bmatrix} 0 & r^* & -q^* \\ -r^* & 0 & p^* \\ q^* & -p^* & 0 \end{bmatrix} = \dot{T}^*_{body/(.)} T^*_{body/(.)} \quad (47)$$

Where the time derivatives of the components of $T^*_{body/(.)}$ are obtained using a HOSM exact differentiator as per Ref [13].

$$\begin{cases} \dot{z}_{0i,j} = v_{0i,j}; i = 1, 2, 3; j = 1, 2, 3 \\ v_{0i,j} = -5L^{1/5}|z_{0i,j} - T_{i,j}|^{4/5}\text{sign}(z_{0i,j} - T_{i,j}) + z_{1i,j}, \\ \dot{z}_{1i,j} = v_{1i,j}, \\ v_{1i,j} = -3L^{1/4}|z_{1i,j} - v_{0i,j}|^{3/4}\text{sign}(z_{1i,j} - v_{0i,j}) + z_{2i,j}, \\ \dot{z}_{2i,j} = v_{2i,j}, \\ v_{2i,j} = -2L^{1/3}|z_{2i,j} - v_{1i,j}|^{2/3}\text{sign}(z_{2i,j} - v_{1i,j}) + z_{3i,j} \\ \dot{z}_{3i,j} = v_{3i,j}, \\ v_{3i,j} = -1.5L^{1/2}|z_{3i,j} - v_{2i,j}|^{1/2}\text{sign}(z_{3i,j} - v_{2i,j}) + z_{4i,j} \\ \dot{z}_{4i,j} = v_{4i,j}, \\ v_{4i,j} = -1.1L\text{sign}(z_{4i,j} - v_{3i,j}) \end{cases} \quad (48)$$

Where
$z_{0i,j} = T_{i,j}$, $z_{1i,j} = T^{(1)}_{i,j}$, $z_{2i,j} = T^{(2)}_{i,j}$, $z_{3i,j} = T^{(3)}_{i,j}$, $z_{4i,j} = T^{(4)}_{i,j}$ is achieved in finite time that can be made very short relative to dynamics of the differentiated signal.
Introducing the angle error $\Delta\Omega I$ wherein the quaternion attitude errors in a 4 component quaternion space errors $(Q^*_{body/(.)} - Q_{body/(.)})$ are mapped to 3 component body axes as:

$$\Delta\Omega I = \begin{bmatrix} \Delta\Omega I_p \\ \Delta\Omega I_q \\ \Delta\Omega I_r \end{bmatrix} = 2\begin{bmatrix} -q_1 & q_0 & q_3 & -q_2 \\ -q_2 & -q_3 & q_0 & q_1 \\ -q_3 & q_2 & -q_1 & q_0 \end{bmatrix}(Q^*_{body/(.)} - Q_{body/(.)}); \quad (49)$$

$$Q^*_{body/(.)} = \begin{bmatrix} q_0^* \\ q_1^* \\ q_2^* \\ q_3^* \end{bmatrix}$$

With each body component being a linear combination of four quaternion components.

In the second step of the fourth embodiment, we set the desired Proportional-Integral error response. Three proportional integral sliding variables define the desired behavior of the error-response is represented as $$\begin{bmatrix} \sigma_p \\ \sigma_q \\ \sigma_r \end{bmatrix} = \begin{bmatrix} \omega_p \Delta\Omega I_p + \Delta p \\ \omega_q \Delta\Omega I_q + \Delta q \\ \omega_r \Delta\Omega I_r + \Delta r \end{bmatrix}; \begin{bmatrix} \Delta p \\ \Delta q \\ \Delta r \end{bmatrix} = \Omega^* - \Omega \quad (50)$$

Where $\Omega$ represents actual rotation rate in body axes and wherein characteristic frequencies $\omega_p$, $\omega_q$, $\omega_r$ are chosen to achieve desired settling time of roll, pitch and yaw.

Interestingly, when $\omega = \omega_p = \omega_q = \omega_r$, Eq. (50) can be represented as $$\begin{bmatrix} \sigma_p \\ \sigma_q \\ \sigma_r \end{bmatrix} = 2\begin{bmatrix} -q_1 & q_0 & q_3 & -q_2 \\ -q_2 & -q_3 & q_0 & q_1 \\ -q_3 & q_2 & -q_1 & q_0 \end{bmatrix}(\omega\Delta Q + \Delta\dot{Q}) \quad (51)$$

The term $(\omega\Delta Q + \Delta\dot{Q})$ represents a 4-vector of sliding variables in quaternion space. Equation (51) projects the 4-vector of sliding variables in quaternion space into a 3-vector of sliding variables in body axes. The dynamics of the sliding variables after the two successive time derivations required to have the control appearing explicitly in the right hand side are represented by:

$$\begin{bmatrix} \dot{\sigma}_p \\ \dot{\sigma}_q \\ \dot{\sigma}_r \end{bmatrix} = \begin{bmatrix} g_p + b_p u_p \\ g_q + b_q u_q \\ g_r + b_r u_r \end{bmatrix} \quad (52)$$

$$\begin{bmatrix} \dot{\sigma}_p \\ \dot{\sigma}_q \\ \dot{\sigma}_r \end{bmatrix} = \begin{bmatrix} \omega_p(\dot{p}^* - \dot{p}) + \ddot{p}^* - \ddot{p} \\ \omega_q(\dot{q}^* - \dot{q}) + \ddot{q}^* - \ddot{q} \\ \omega_r(\dot{r}^* - \dot{r}) + \ddot{r}^* - \ddot{r} \end{bmatrix} \quad (53)$$

(i) $\ddot{p}^*, \ddot{q}^*, \ddot{r}^*$ and $\dot{p}^*, \dot{q}^*, \dot{r}^*$ could be calculated numerically using a HOSM differentiator.
(ii) The calculation of $\dot{p}, \dot{q}, \dot{r}$ would be as follows $$\dot{q} = \frac{1}{I_{yy}}\{M_{aero} + M_{thrust} + pr[I_{zz} - I_{xx}] + I_{xz}[r^2 - p^2]\} \quad (54)$$

$$\begin{bmatrix} \dot{p} \\ \dot{r} \end{bmatrix} = \begin{bmatrix} I_{xx} & -I_{xz} \\ -I_{xz} & I_{zz} \end{bmatrix}^{-1} \begin{Bmatrix} L_{aero} + L_{prop} + pqI_{xz} + qr[I_{yy} - I_{zz}] \\ N_{aero} + N_{prop} - rqI_{xz} + qp[I_{xx} - I_{yy}] \end{Bmatrix} \quad (55)$$

With $$I = \begin{bmatrix} I_{xx} & 0 & -I_{xz} \\ 0 & I_{yy} & 0 \\ -I_{xz} & 0 & I_{zz} \end{bmatrix} \quad (56)$$

And the torque commands are given by:

$$\begin{bmatrix} L \\ N \\ M \end{bmatrix} = \begin{bmatrix} .5\rho SV^2 b \left\{ Cl_\beta \beta + Cl_{\delta n}\delta n + Cl_{\delta l}\delta l + \frac{b/2}{V}[Cl_p p + Cl_r r] \right\} \\ .5\rho SV^2 b \left\{ CN_\beta \beta + CN_{\delta n}\delta n + CN_{\delta l}\delta l + \frac{b/2}{V}[CN_p p + CN_r r] \right\} \\ .5\rho SV^2 \overline{C} \left\{ CM_\alpha \alpha + CM_{\delta m}\delta m + \frac{\overline{C}}{V}[CM_q q] \right\} \end{bmatrix} \quad (57)$$

then Eqs. (54-55, 57) are derived with respect to time. As this is done the time derivatives of $\delta l, \delta m, \delta n$ are $$\dot{\delta}_{(.)} = \frac{-\delta_{(.)} + u_{(.)}}{\tau_{(.)}}; \; (.) = l, m, n \quad (58)$$

Clearly, the expansion of Eq. (53) transforms the three Single-Input-Single-Output control problems in a Multiple-Input-Multiple-Output control problem much more difficult to solve. With this HOSM design we lump together all effects other than the direct effect of roll, pitch and yaw actuator as $g_{(.)};(.)=p,q,r$, without having explicit ting the complex terms represented in Eqs. (54-58) and without incurring the risk of introducing inevitable model errors. We do not define all the variables in Eqs. (54-58) since we do use them in the HOSM design.

wherein $g_{(.)};(.)=p,q,r$ represent unknown but yet bounded effects of all the dynamics with the exception of $\hat{b}_{(.)}u_{(.)};(.)=p,q,r$ and wherein $\hat{b}_{(.)}u_{(.)}$ represents the effects that roll, pitch and yaw command to either continuous or on-off commands would have on roll, pitch and yaw sliding surface dynamics In one embodiment, the effects represented by $b_{(.)}u_{(.)};(.)=p,q,r$ and modeled effects $\hat{b}_{(.)}u_{(.)}$ used in the design of the controller may differ by relative $b_{(.)}u_{(.)}$ errors as large as 30% in relative terms without any adverse effect on controller performance as they are implicitly accounted for in the unknown bounded term $g_{(.)};(.)=p,q,r$.

The third step of the fourth embodiment is the design of the HOSM controller that will drive sliding variables Eq. (50) to zero.

During the first part of the interceptor flight, the attitude motion is achieved using a continuous TVC actuator. Related background material may be found in Shtessel, Shkolnikov and Levant in Ref 12, Levant in Ref 13, Shtessel and Tournes in Ref 16. We introduce auxiliary Proportional-Derivative surfaces designed to reduce the relative degree, Since the Second Order Sliding Mode controller is designed to operate with systems of relative degree=1.

$$\sigma'_{(.)} = c\sigma_{(.)} + \dot{\sigma}_{(.)} \quad (59)$$

The corresponding controller is $$U_{(.)} = \alpha_1 |\sigma'_{(.)}|^{2/3} \text{sign } \sigma'_{(.)} + \alpha_2 \int |\sigma'_{(.)}|^{1/3} \text{sign}(\sigma'_{(.)}) d\tau + z1_{(.)}; \; (.) = q, r$$

$$\dot{z}_0 = v_0 + U_{(.)}; \; v_0 = -3|L|^{1/3}|z_0 - \sigma'_{(.)}|^{2/3} \text{sign}(z_0 - \sigma_{(.)}) + z_1$$

$$\dot{z}_1 = v_1; \; v_1 = -2|L|^{1/2} \text{sign}(z_1 - v_0)|z_1 - v_0|^{1/2} + z_2$$

$$\dot{z}_2 = v_2; \; v_2 = -1.5|L| \text{sign}(z_2 - v_1) \quad (60)$$

The Lipshitz constant L must be $g_{(.)}^{(2)}$ the $2^{nd}$ derivative of the disturbing terms, $$\left| \frac{g_{(.)}^{(2)}}{g_{(.)}} \right| < L, (.) = p, q, r$$

The control of pitch and yaw attitude motion during KV autonomous flight and the control of roll motion during boost and KV flight are achieved by means of on-off PWM thrusters. Corresponding control laws are designed as follows:

The relative degree=2, The Nonlinear Filter with Pulse Width Modulation controller is designed directly as $$\begin{cases} \dot{X}_{(.)} = \xi_{(.)} |\sigma_{(.)}|^{0.5} \text{sign}(\sigma_{(.)}) - \eta_{(.)} |J_{(.)}|^{0.5} \text{sign}(J_{(.)}); \; (.) = p, q, r \\ J_{(.)} = X_{(.)} + \sigma_{(.)}; \\ u_{[.]} = F_{(.)}(J_{(.)}, d_{(.)}(t)); \quad [.] = l, m, n \end{cases} \quad (61)$$

Where $$F_{(.)}(J_{(.)}, d_{(.)}(t)) = \begin{cases} -\rho_{(.)}0 & \text{if } J + d(t) > \varepsilon \\ 0 & \text{if } |J + d(t)| \leq \varepsilon \\ \rho_{(.)}0 & \text{if } J + d(t) < \varepsilon \end{cases} \quad (62)$$

Where the dither signal d(t) is represented in FIG. 6B.

Figure 19:
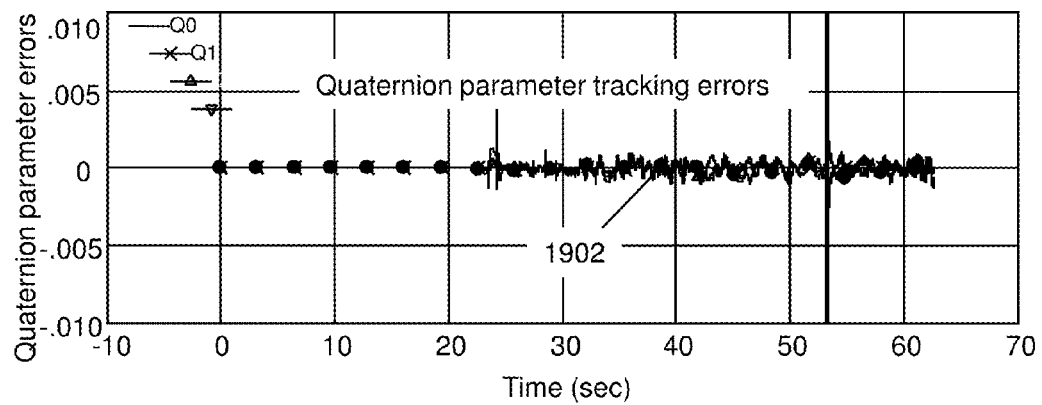
FIG. 19 represents attitude quaternion parameters errors
Figure 20:
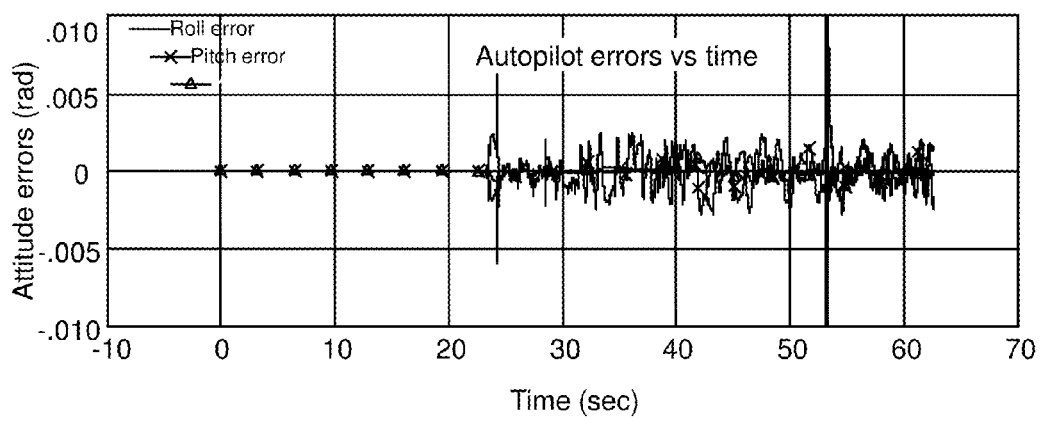
FIG. 20 represents autopilot angle errors
Figure 21:
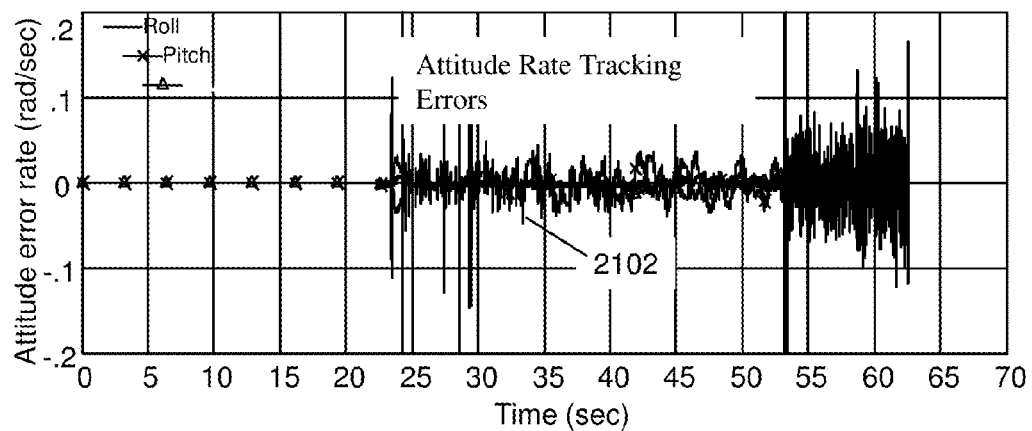
FIG. 21 represents attitude rate errors

The four quaternion parameteter errors (the difference between the prescribed value of the quaternion parameters and actual values) are shown FIG. 19. One can also notice the brief transient at t=55 1902 as the autopilot switches from one mode to the next. The quaternion parameter errors are less than 0.001 during most of the flight.

The same observation can be made regarding angular errors shown 2002 FIG. 206. Attitude angular errors are <1.5 mrad.

Attitude angular rate errors 2102 shown FIG. 217 are also very small; about 1 deg/sec in the first segment they are noisier, about 4 deg/sec during the KV terminal flight segment. The reason is that during this phase lateral divert is achieved by on-off firing of divert thrusters. Each firing creates a brief and large acceleration pulse. Since the divert thrusters are not placed exactly at the center of gravity which moves during the flight, this creates a brief intense moment disturbance.

Figure 22:
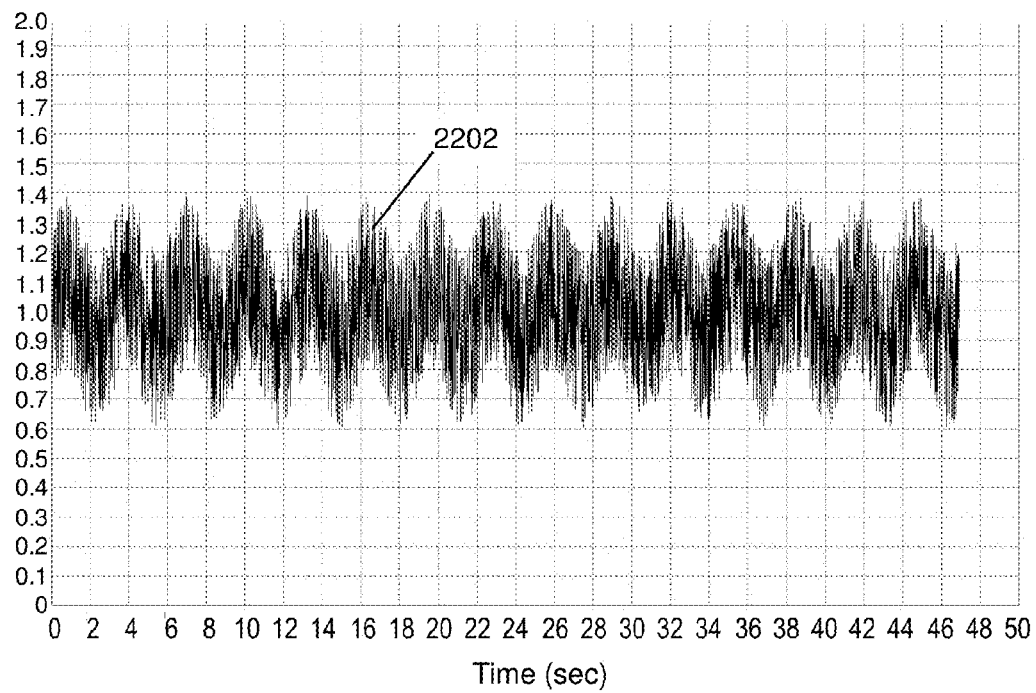
FIG. 22 represents multiplicative disturbances applied upon the actuators.
Figure 23:
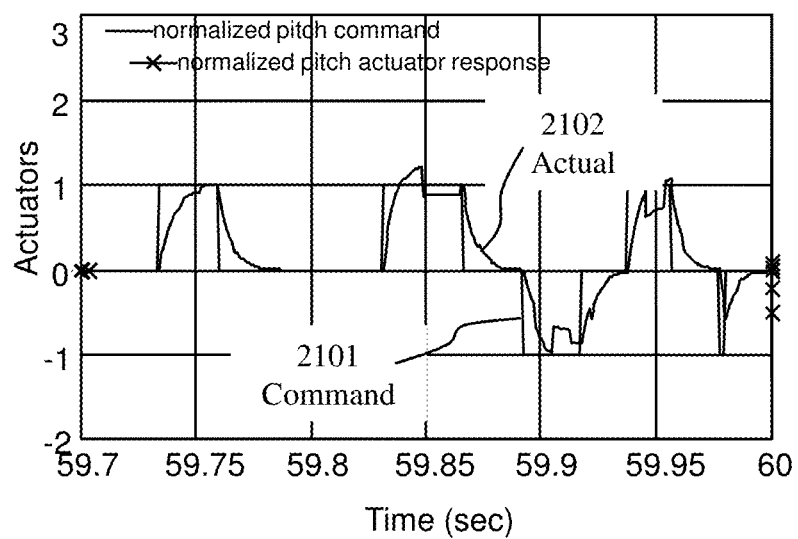
FIG. 23 represents the comparision between normalized pitch and actual responses thereof.

As indicated before and as shown in the formulae presented before, the HOSM design of the autopilot does not require values for interceptor control characteristics other than a very broad estimation of the upper bound of the disturbances. To demonstrate even further the inherent robustness of the design we have applied multiplicative disturbances to the magnitude of the thrusters. Applying this disturbance, as shown in FIG. 22, it is possible for the maximum magnitude of a thruster to be as some point in time 1.3 times the nominal value and 50 msec after to be 0.8 times this value. FIG. 22 shows the multiplicative disturbance 2202 applied to each commanded thruster actuation to simulate a thruster with this degree of unknown thrust. In the inventor's experience, such a rapid and large amplitude variation of the thrust level cannot be estimated in real-time by a disturbance accommodating controller.

Likewise, the modeling of such effects would require very complex codes that account for the combination of the effects of the multiple simultaneous causes of such disturbances which not only include the fast variation of the maximum thrust, but also a slow sinusoidal modulation for the disturbances caused by slowly varying effects such as air density or velocity change.

Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the appended claims and their equivalents.

Appendix I, Symbols and notations used in this disclosure:

| Symbols and notations used in this disclosure: | |
| --- | --- |
| CG | Center of gravity (in body axes) |
| CP | Center of pressure (in body axes) |
| CG | Center of gravity along x-axis |
| CP | Center of pressure along x-axis |
| Lat, G, SG | Latitude, Longitude, Sidereal angle |
| NED | North, East Down |
| ECI | Earth Centered Inertial |
| $T_b^a$ | Transformation matrix from frame a to frame b |
| $Q_b^a$ | Quaternion representing the transformation matrix from frame a to frame b |
| $^\kappa[.]$ | Lead angle around y-body and z-body |
| L | Lipshitz constant |
| r, v, Γ | Position, velocity and acceleration vectors |
| $u_{(.)}$; (.) (ζ = pitch) , η = yaw | Normalized seeker commands |
| $u_\delta, u_\Delta, u_\zeta$ | Attitude, Divert and TVC normalized controls, with |
| | $\delta = [\delta_p, \delta_q, \delta_r]$ roll, pitch and yaw commands |
| | $\Delta = [\Delta_x, \Delta_y, \Delta_z]$ x, y, z (body) divert commands |
| | $\zeta = [\zeta = $ pitch, $\upsilon = $ yaw] moments around y-body, z-body |
| Ω, ΩI | Vector of body rates, vector of angles |
| ΔΩ = Ω* − Ω | Vector of body rate errors |
| ΔΩI | Vector of body (position errors) = "integral errors" |
| | ΔΩ = ΔΩ̇I but ΔΩI ≠ ∫ΩIdτ |
| ψ, θ, φ | Euler's yaw, pitch and roll angles |
| α, γ, q | Angle of attack, flight path angle, pitch rate |
| $\epsilon_{(.)}$; (.) = az, el | Target angular error with respect to boresight, also $\epsilon_{az} = \epsilon$; $\epsilon_{el} = \mu$ |
| ω | Characteristic frequency rad/sec |
| ζ, υ | Pitch, yaw rotation of boresight |
| (.) | Generic variable |
| (.)* | Prescribed, commanded value of variable (.) |
| $\bar{(.)}$ | Measured value of variable (.) |
| $\hat{(.)}$ | Estimated value of variable (.) |
| $\tilde{(.)} = \hat{(.)} - (.)$ | Error in estimation of variable (.) |
| $\tilde{(.)} = \bar{(.)} - (.)$ | Error in measurement of variable (.) |
| $(.)_{\|\|}, (.)_{\perp [.]}$ | Component of variable (.) along boresight and [.] along y-boresight and z-bore-sight |
| $(.)^T, (.)^M; (.)_T, (.)_M$ | Variable (.) applied to target, interceptor |
| t, tgo | Current time, time to go sec. |
| s | Laplace variable rad/sec |
| d; 1 + d | Disturbance, multiplicative disturbance |
| λ | Line of sight angle |
| λ* | Boresight angle |
| Lat | Latitude |
| G | Longitude |
| M | Mach number |
| press | Atmospheric pressure |
| S | Reference (cross) sectional area |
| $CL_\alpha$ | Lift gradient |
| m | Current missile mass |
| F | Thrust magnitude |

Appendix II Contains reference cited in this disclosure. All of the following references are incorporated herein by reference in their entirety.

US Patent Documents

U.S. Pat. No. 6,244,536 B1, issued June 2001 to Cloutier;
U.S. Pat. No. 7,185,844 B2 issued March 2007 to Yanushevsky;
U.S. Pat. No. 6,532,454 B1 issued March 2003 to Werbos;
US RE37,331 E issued August 2001 to Schroeder;
U.S. Pat. No. 6,341,249 B1 issued January 2002 to Xin et al.;
U.S. Pat. No. 6,611,823 B1 issued July 2003 to Selmic et al.; and
U.S. Pat. No. 7,080,055 B2 issued July 2006 to Campos et al.

Non Patent References

1. R. T., Yanushevsky and W. J., Bond, "New Approach to Guidance Law Design," *AIAA Journal of Guidance Control and Dynamics*, Vol. 27, no. 4 July, August 2004 issue, pp. 1-5.
2. P. Zarchan, "Tactical and Strategic Missile Guidance" *AIAA Progress in Astronautics and Aeronautics*, Vol. 157, AIAA Reston Va., pp. 25-43.
3. P. Gurfiel., M. Jodorovsky., and M. Guelman, "Neoclassical Guidance for Homing Missiles," *AIAA Journal of Guidance Control and Dynamics*, Vol. 24, no. 3 May, June, 2001 issue, pp. 452-459.
4. S. Gutman., "Can Lead-Guidance Compensator Guarantee Zero Miss Distance" *AIAA Journal of Guidance Control and Dynamics*, Vol. 31, no. 3 May, June 2008 issue, pp. 779-782.
5. R. T. Chen., J. L, Speyer. and D. Lianos., "Homing missile Guidance and Estimation Under Agile Target acceleration," *AIAA Journal of Guidance Control and Dynamics*, Vol. 30, no. 6 November, December 2007 issue, pp. 1577-1589.
6. D. Dionne., H. Michalska., and J. Shinar., and Y. Oshman., "Decision-Directed Adaptive Estimation and Guidance for an Interception Endgame," *AIAA Journal of Guidance Control and Dynamics*, Vol. 29, no. 4 July, August 2006 issue, pp. 970-980.
7. H. Hablani., "Endgame Guidance and Relative Navigation of Strategic Interceptors with Delays" *AIAA Journal of Guidance Control and Dynamics*, Vol. 29, no. 1 January, February 2006 issue, pp. 82-94.
8. I. Shkolnikov, Y. B. Shtessel, P. Zarchan, D. Lianos "Simulation Study of the Homing Interception Guidance Loop with Sliding Mode Observers Versus Kalman Filters," *Proceedings of* 2001 *AIAA Guidance, Navigation, and Control Conference*, AIAA Paper 2001-4216.
9. Kennedy, W. B., and Mikelsen, C, "AIT Real Gas Divert Jet Interactions; Summary of Technology," AIAA Paper 98-5188, 1998, pp. 225-234.
10. M. Idan., T. Shime., and O. M. Golan., "Integrated Sliding Mode Autopilot Guidance for Dual-Control Missiles," *AIAA Journal of Guidance Control and Dynamics*, Vol. 30, no. 4 July, August 2007 issue, pp. 1081-1089.
11. M. S. Bhat., D. S. Bai., A. A. Powly., K. N. Swamy., and D. Ghose., "Variable Structure Controller Design with Application to Missile Tracking," *AIAA Journal of Guidance Control and Dynamics*, Vol. 24, no. 4 July, August 2001 issue, pp. 859-862.

12. Shtessel Y., Shkolnikov, I., and Levant A., "Smooth Second Order Sliding Modes: Missile Guidance Application," *Automatica*, Vol. 43, No.8, 2007, pp. 1470-1476.

13. Levant, A., "Higher-order sliding modes, differentiation and output-feedback control". *International Journal of Control*, 76, 9/10, 2003, 924-94

14. Shkolnikov I., Shtessel Y., and Lianos D. Integrated Guidance-Control System of a Homing Interceptor: Sliding Mode Approach, *Proceedings of* 2001 *AIAA Guidance, Navigation, and Control Conference*, AIAA Paper 2001-4218.

15. C. Tournes, Y. B. Shtessel, I. Shkolnikov, "Autopilot for Missiles Steered by Aerodynamic Lift and Divert Thrusters," *AIAA Journal of Guidance Control and Dynamics*, Vol. 29, no. 3, May, June 2006 issue, pp. 617-625.

16. Y. B. Shtessel, C. Tournes, "Integrated Higher-Order Sliding Mode Guidance & Autopilots for Dual-Control Missiles," *AIAA Journal of Guidance Control and Dynamics*, Vol. 32, no. 1 January, February 2009 issue, pp. 74-94

17. B. L. Stevens, F. L. Lewis, "Aircraft Control and Simulation," J. Willey and sons, pp. 42,-43, New York, 1992

What is claimed is:

1. A system for guiding a missile to intercept a target comprising:
    a target sensor providing line of sight information relating to a position of said target relative to said missile;
    an inertial measuring unit providing inertial states of said missile;
    an attitude autopilot controlling said missile attitude;
    a guidance processor, said guidance processor having a memory containing processing instructions for guiding said missile to said target based on said line of sight information and said inertial states of said missile; said processing instructions including a high order sliding mode control process wherein said high order sliding mode control process enforces a guidance strategy for guiding said missile to intercept said target; said guidance processor generating a total lateral divert acceleration command;
    at least one lateral divert actuator receiving said total lateral divert command and producing a primary lateral acceleration component directly responsive to said total lateral divert acceleration command;
    said attitude autopilot receiving said total lateral divert acceleration command and producing a secondary lateral acceleration component in accordance with said total lateral divert acceleration command; said primary lateral acceleration component and said secondary lateral acceleration command cooperating to produce a total acceleration corresponding to said total lateral divert command;
    said primary lateral acceleration component and said secondary lateral acceleration cooperate to produce a total acceleration corresponding to said total lateral divert acceleration command wherein said total lateral divert acceleration command is derived based on said high order sliding mode control process;
    wherein said secondary acceleration component is accommodated in said sliding mode control process as a cooperative component of bounded disturbance that reduces an upper Lipschitz bound of initial disturbance.

2. The system in accordance with claim 1, wherein said a least one lateral divert actuator does not require orienting body attitude to produce said primary lateral acceleration component and said autopilot utilizes a secondary divert actuator that does require orienting body attitude to produce said secondary lateral acceleration component.

3. The system in accordance with claim 2, wherein said at least one lateral divert actuator is a lateral actuator producing lateral force proximal to a center of gravity of said missile to divert said missile laterally with minimal change in an angle of attack.

4. The system in accordance with claim 3, wherein said lateral actuator may be a continuous actuator such as moving control surface, proportional divert thruster or an on-off thruster with a pulse width modulation duty cycle of said on off thruster; commanded lateral thrust is established in accordance with said total lateral divert acceleration command.

5. The system in accordance with claim 3, wherein said high order sliding mode control process comprises a sliding variable in accordance with:

$$\dot{\sigma}_{(.)} = f_{(.)} + g_{(.)} - \bar{b}\Delta_{(.)}; (.) = \text{pitch, yaw;}$$

wherein said total lateral acceleration designed to drive the sliding variable to zero, that is to the sliding surface is:

$$\Delta_{(.)} = \frac{1}{\bar{b}}\left\{\hat{f}_{(.)} + \alpha_1 |\sigma_{(.)}|^{2/3}\text{sign}(\sigma_{(.)}) + \alpha_2 \int |\sigma_{(.)}|^{1/3}\text{sign}(\sigma_{(.)}) d\tau\right\}.$$

6. The system in accordance with claim 5, wherein said attitude autopilot concurrently acts to set an angle of attack to achieve said secondary lateral acceleration, wherein said secondary acceleration reduces a said disturbance in accordance with:

$$g^2_{(.)} = g_{(.)} - \Delta\Gamma_{(.)}; |g^2_{(.)}| < |g_{(.)}|;$$

thereby allowing the interception of targets having maneuvering capability requiring interceptor divert capability greater than that achievable by said lateral divert actuator alone.

7. The system in accordance with claim 3, wherein said primary divert actuator is capable of generating at least one third of said total lateral divert acceleration.

8. The system in accordance with claim 3, wherein said primary actuator produces said primary lateral acceleration with a faster response time than said lateral autopilot produces said secondary lateral acceleration.

9. The system in accordance with claim 1, wherein said attitude autopilot controls an attitude thruster positioned distal from a center of gravity of said missile to rotate said missile to generate an angle of attack, said angle of attack generating said secondary lateral acceleration either by aerodynamic interaction and/or by orientation of booster/sustainer thrust.

10. The system in accordance with claim 9, wherein said attitude thruster is an on-off thruster.

11. The system in accordance with claim 9, wherein said attitude autopilot controls an axial thrust vector control to rotate an attitude of said missile to generate said secondary lateral acceleration.

12. The system in accordance with claim 9, wherein said attitude autopilot controls an attitude control surface to rotate attitude of said missile to generate said secondary lateral acceleration.

13. A system for guiding a missile to intercept a target comprising:
    a target position information source providing estimated target position information;
    an inertial measuring unit providing estimated inertial states of said missile;

a guidance processor, said guidance processor having a memory containing processing instructions for guiding said missile to said target based on said target position information and said inertial states of said missile; said guidance processor generating a divert acceleration command in boresight coordinates;

an attitude autopilot receiving either direct attitude commands or said lateral divert acceleration command and converting said lateral divert acceleration command in boresight frame to commanded attitude; wherein said attitude autopilot utilizes a high order sliding mode process to determine said at least one lateral actuator command wherein non-linear dynamic effects of a lateral actuator commanded by said at least one lateral actuator command are accommodated as disturbances within a Lipschitz bound for said high order sliding mode process.

14. The system in accordance with claim 13, wherein said lateral control actuator further produces a cross coupling effect in another axis as a function of said actuator command and said cross coupling effect is implicitly accommodated by said sliding mode process as being within said Lipschitz bound.

15. The system in accordance with claim 13, wherein said lateral actuator is a linear proportional thruster, an on-off thruster, an aerodynamic control surface, or a thrust vector control.

16. The system in accordance with claim 13, wherein the orientation of the desired body frame is obtained by two rotations of angle-of-attack in the pitch and yaw plane conducive to achieving desired normal and lateral accelerations around said velocity frame defined with its first axis along the velocity vector, third axis along local ascending vertical and second axes to form a direct reference; and prescribed aerodynamic angles conducive to achieving said lateral accelerations are calculated iteratively by:

$$\alpha_{(.)} = \frac{\Gamma_{\perp(.)}^T}{\cos(\kappa_{[.]})\left(\frac{0.7pM^2SCL_\alpha}{m} + \frac{F}{m}\cos(\alpha_{(.)})\right)}$$

(.) = pitch, yaw;  [.] = elevation, azimuth where $\kappa_{[.]}$ pitch or yaw lead angles.

17. The system in accordance with claim 16, wherein the pitch or yaw lead angles are calculated by first calculating the LOS frame, said LOS frame first vector $I_x$ is a bore-sight direction and the two other axes are calculated by:

$$I_y = \frac{I_x \times rI}{|I_x \times rI|}$$

$$I_z = \frac{I_x \times I_y}{|I_x \times I_y|}$$

where rI is the local vertical unit-vector; the velocity frame is calculated with the first vector $J_x$ in the direction of the interceptor velocity vector and two other axes calculated by:

$$J_y = \frac{J_x \times rI}{|J_x \times rI|}$$

$$J_z = \frac{J_x \times J_y}{|J_x \times J_y|}$$

and $$\kappa_{az} = a\cos(J_y I_y); \kappa_{El} = a\cos\left(J_z \frac{rI}{|rI|}\right) - a\cos\left(I_z \frac{rI}{|rI|}\right).$$

18. The system in accordance with claim 13, wherein four-component quaternion attitude errors are mapped to three-component body axes using a linear combination of said four component quaternion attitude error; wherein said four-component attitude errors include effects of Earth's rotation and oblateness.

19. The system in accordance with claim 18, wherein the four-component quaternion attitude errors are mapped to the three-component body axes as:

$$\Delta\Omega I = \begin{bmatrix} \Delta\Omega I_p \\ \Delta\Omega I_q \\ \Delta\Omega I_r \end{bmatrix} = 2\begin{bmatrix} -q_1 & q_0 & q_3 & -q_2 \\ -q_2 & -q_3 & q_0 & q_1 \\ -q_3 & q_2 & -q_1 & q_0 \end{bmatrix}(Q^*_{body/(.)} - Q_{body/(.)});$$

$$Q^*_{body/(.)} = \begin{bmatrix} q_0^* \\ q_1^* \\ q_2^* \\ q_3^* \end{bmatrix}.$$

20. The system in accordance with claim 13, wherein the quaternion attitude rate errors in 4 component quaternion space errors ($\dot{Q}^*_{body/(.)} - \dot{Q}_{body/(.)}$) are mapped to 3 component body axes, wherein prescribed body rate errors are derived from the time-derivative $\dot{T}^*_{body/(.)}$ of transformation matrix $T^*_{body/(.)}$ representing prescribed attitude with respect to chosen reference as:

$$\Omega^* \times_{body} = \begin{bmatrix} 0 & r^* & -q^* \\ -r^* & 0 & p^* \\ q^* & -p^* & 0 \end{bmatrix} = \dot{T}^*_{body/(.)} T^*_{body/(.)}$$

and where the time derivatives of transformation matrix $T^*_{body/(.)}$ are accurately calculated using a higher order differentiator.

21. The system in accordance with claim 13 wherein said high order sliding mode controller comprises sliding variables which may be defined as:

$$\begin{bmatrix} \sigma_p \\ \sigma_q \\ \sigma_r \end{bmatrix} = \begin{bmatrix} \omega_p \Delta\Omega I_p + \Delta p \\ \omega_q \Delta\Omega I_q + \Delta q \\ \omega_r \Delta\Omega I_r + \Delta r \end{bmatrix}; \begin{bmatrix} \Delta p \\ \Delta q \\ \Delta r \end{bmatrix} = \Omega^* - \Omega$$

wherein characteristic frequencies $\omega_p, \omega_q, \omega_r$ represent a settling time of roll, pitch and yaw respectively.

22. The system in accordance with claim 21, wherein said higher order roll, pitch and yaw surfaces may be differentiated twice as:

$$\begin{bmatrix} \dot\sigma_p \\ \dot\sigma_q \\ \dot\sigma_r \end{bmatrix} = \begin{bmatrix} \omega_p(\dot p^* - \dot p) + \ddot p^* - \ddot p \\ \omega_q(\dot q^* - \dot q) + \ddot q^* - \ddot q \\ \omega_r(\dot r^* - \dot r) + \ddot r^* - \ddot r \end{bmatrix};$$

wherein the explicit representation of the right hand side terms of previous equation results in very complex expressions with multiple couplings of the variables of the three equations and numerous terms prone to model uncertainties; and wherein the missile autopilot system in accordance with claim 10, wherein said sliding mode roll, pitch and yaw dynamics can be represented as:

$$\begin{bmatrix} \dot\sigma_p \\ \dot\sigma_q \\ \dot\sigma_r \end{bmatrix} = \begin{bmatrix} g_p + b_p u_p \\ g_q + b_q u_q \\ g_r + b_r u_r \end{bmatrix};$$

and wherein $g_{(\cdot)};(\cdot)=p,q,r$ represent unknown but yet bounded effects of all the dynamics with the exception of $\hat b_{(\cdot)} u_{(\cdot)};(\cdot)=p,q,r$ and wherein $\hat b_{(\cdot)} u_{(\cdot)}$ represents the effects that roll, pitch and yaw command to either continuous or on-off commands would have on roll, pitch and yaw sliding surface dynamics.

23. The system in accordance with claim 22, wherein the insensitivity of higher order sliding mode controllers to matched disturbance allows hiding the considerable complexity, coupling and nonlinearity when expanding terms $\dot p, \dot q, \dot r$ and $\ddot p, \ddot q, \ddot r$ and the source of model uncertainties in the modeling of attitude rate stability derivatives as unknown bounded disturbances $g_p, g_q, g_r$.

24. The system in accordance with claim 22, wherein actual effects represented by $b_{(\cdot)} u_{(\cdot)};(\cdot)=p,q,r$ and modeled effects $\hat b_{(\cdot)} u_{(\cdot)}$ used in the design of the controller may differ by relative $\hat b_{(\cdot)} u_{(\cdot)}$ errors as large as 30% in relative terms without any adverse effect on controller performance as they are implicitly accounted for in the unknown bounded term $g_{(\cdot)};(\cdot)=p,q,r$.

25. The system in accordance with claim 21, wherein the lateral control actuator may be either a continuous thrust vector controller or aerodynamic continuous control surface of a discontinuous on-off attitude thruster.

26. The system in accordance with claim 25, wherein said lateral actuator is a continuous actuator and said actuator control is represented by:

$$U_{(\cdot)} = \alpha_1 |\sigma'_{(\cdot)}|^{2/3} \text{sign} \sigma'_{(\cdot)} + \alpha_2 \int |\sigma'_{(\cdot)}|^{1/3} \text{sign}(\sigma'_{(\cdot)}) d\tau + z1$$
$$(\cdot); (\cdot) = q, r$$

$$\dot z_0 = v_0 + U_{(\cdot)};\ v_0 = -3|L|^{1/3} |z_0 - \sigma'_{(\cdot)}|^{2/3} \text{sign}(z_0 - \sigma_{(\cdot)}) + z_1$$

$$\dot z_1 = v_1;\ v_1 = -2|L|^{1/2} \text{sign}(z_1 - v_0) |z_1 - v_0|^{1/2} + z_2$$

$$\dot z_2 = v_2;\ v_2 = -1.5|L| \text{sign}(z_2 - v_1),$$

where $\sigma'_{(\cdot)} = c\sigma_{(\cdot)} + \dot\sigma_{(\cdot)}$.

27. The system in accordance with claim 25, wherein said lateral actuator is an on-off actuator and said on-off actuator control is represented by a nonlinear filter with pulse width a modulation controller described by:

$$\begin{cases} \dot\chi_{(\cdot)} = \xi_{(\cdot)} |\sigma_{(\cdot)}|^{0.5} \text{sign}(\sigma_{(\cdot)}) - \eta_{(\cdot)} |J_{(\cdot)}|^{0.5} \text{sign}(J_{(\cdot)}); & (\cdot) = p, q, r \\ J_{(\cdot)} = \chi_{(\cdot)} + \sigma_{(\cdot)}; & \\ u_{[\cdot]} = F_{(\cdot)}(J_{(\cdot)}, d_{(\cdot)}(t)); & [\cdot] = l, m, n \end{cases}$$

where $$F_{(\cdot)}(J_{(\cdot)}, d_{(\cdot)}(t)) = \begin{cases} -\rho_{(\cdot)0} & \text{if } J + d(t) > \varepsilon \\ 0 & \text{if } |J + d(t)| \le \varepsilon, \\ \rho_{(\cdot)0} & \text{if } J + d(t) < \varepsilon \end{cases}$$

where d(t) is a dither signal.

28. A system for guiding a missile to intercept a target comprising:
 a target sensor providing line of sight information relating to a position of said target relative to said missile;
 an inertial measuring unit providing inertial states of said missile;
 a guidance processor, said guidance processor having a memory containing processing instructions for guiding said missile to said target based on said line of sight information and said inertial states of said missile; said processing instructions including a high order sliding mode control process wherein said high order sliding mode control process enforces a guidance strategy for guiding said missile to intercept said target by driving a sliding surface representing the guidance strategy to zero; said guidance processor generating a lateral divert acceleration command;
 a lateral actuator receiving said lateral divert acceleration command and producing a lateral acceleration component in accordance with said lateral divert acceleration command; said primary lateral acceleration component and said secondary lateral acceleration command cooperating to produce said lateral divert acceleration;
 wherein said lateral divert acceleration is derived based on said high order sliding mode control process; and
 wherein said secondary acceleration component is accommodated in said sliding mode control process as a component of bounded disturbance tolerated by said sliding mode control process in accordance with a Lipschitz bound for said sliding mode control process.

29. The system in accordance with claim 28, wherein the interception reaches a collision condition before impact.

30. The system in accordance with claim 29, wherein the interception strategy is represented by:

$$\begin{cases} \sigma_{(\cdot)} = \omega Z_{T_{\perp(\cdot)}} + V_{\perp(\cdot)}; & (\cdot) = \text{normal}(Z), \text{perpendicular}(Y) \\ \omega = \dfrac{1}{tgo_{min}} & \text{if } tgo < tgo_{min} \\ \omega = \dfrac{1}{tgo_{max}} & \text{if } tgo > tgo_{max} \\ \omega = \dfrac{1}{tgo} & \text{if } tgo_{min} \le tgo \le tgo_{max} \end{cases},$$

where $V_{\perp(\cdot)}$ and $Z_{T_{\perp(\cdot)}}$ represent respectively target relative velocity and position with respect to boresight and $tgo_{max}$ and $tgo_{min}$ relate to achieving a time to intercept and to avoiding excessive gains during initial flight.

31. The system in accordance with claim 28, wherein said dynamics of said sliding surface is represented by:

$$\dot\sigma = f(t) + u,\ \sigma \in \mathfrak{R}$$

where u represents commanded lateral acceleration and unknown, bounded disturbing term f(t) represents unknown dynamical effects; which can be separated into target acceleration $\Gamma_{\perp(\cdot)}^T$ and other terms $\eta_{(\cdot)}$ as $$f(t) = \Gamma_{\perp(.)}^T + \eta_{(.)} = \begin{cases} \Gamma_{\perp(.)}^T + \dfrac{V_{\perp(.)}}{tgo_{min}} - V_{\parallel}\dot{\lambda} & \text{if } tgo < tgo_{min} \\ \Gamma_{\perp(.)}^T + \dfrac{Z_{T_{\perp(.)}}}{tgo^2} + \dfrac{V_{\perp(.)}}{tgo} - V_{\parallel}\dot{\lambda} & \text{if } tgo_{min} \leq tgo \leq tgo_{max} \\ \Gamma_{\perp(.)}^T + \dfrac{V_{\perp(.)}}{tgo_{max}} + \dfrac{V_{\perp(.)}}{tgo} - V_{\parallel}\dot{\lambda} & \text{if } tgo > tgo_{max} \end{cases}$$

where $\eta_{(.)}$ represents the terms other than target acceleration that are compensated explicitly; here target acceleration $\Gamma_{\perp(.)}^T$ is either estimated by an external observer as $\hat{\Gamma}1_{\perp(.)}^T$, or as $\hat{\Gamma}2_{\perp(.)}^T$ calculated by an observer embedded with guidance which not only estimates target acceleration but effects of disturbance terms such as errors in terms $V_{\perp(.)}$, tgo and $V_{\parallel}\dot{\lambda}$, and the guidance controller is given by:

$$\begin{cases} u_{(.)} = \hat{\Gamma}_{\perp(.)}^T + \hat{\eta}_{(.)} - \alpha_1|\sigma_{(.)}|^{2/3}\text{sign}(\sigma_{(.)}) + w \\ \dot{w} = -\alpha_2|\sigma_{(.)}|^{1/3}\text{sign}(\sigma_{(.)}); \quad (.) = \text{normal}(Z), \text{transversal}(Y) \end{cases}$$

$$\hat{\Gamma}_{\perp(.)}^T = sel(\hat{\Gamma}1_{\perp(.)}^T, \hat{\Gamma}2_{\perp(.)}^T).$$

32. The system in accordance with claim 31, wherein the estimation target acceleration $\hat{\Gamma}2_{\perp(.)}^T$ is achieved for targets with estimated frequency of maneuvers $\leq 0.8$ Hz by a smooth observer described by:

$$\begin{cases} \dot{z}_0 = v_0 + u \\ v_0 = -2L^{1/3}|z_0 - \sigma|^{2/3}\text{sign}(z_0 - \sigma) + z_1 \\ \dot{z}_1 = v_1 \\ v_1 = -1.5L^{1/2}|z_1 - v_0|^{1/2}\text{sign}(z_1 - v_0) + z_2 \\ \dot{z}_2 = -1.1L\text{sign}(z_2 - v_1) \\ z_1 \to \hat{\Gamma}2_{\perp(.)}^T \text{ before intercept} \end{cases}.$$

33. The system in accordance with claim 28, when the estimated frequency of target maneuvers is >0.8 Hz wherein target acceleration $\hat{\Gamma}2_{\perp(.)}^T$ is estimated using an unsmooth observer described by:

$$\begin{cases} \dot{z}_0 = v_0 + u \\ v_0 = -1.5L^{1/2}|z_0 - \sigma|^{1/2}\text{sign}(z_0 - \sigma) + z_1 \\ \dot{z}_1 = -1.1L\text{sign}(z_1 - v_0) \\ z_1 \to \hat{\Gamma}2_{\perp(.)}^T \text{ before intercept} \end{cases}.$$

34. The system in accordance with claim 28, wherein the dynamics of the sliding surface is:

$$\dot{\sigma}_{(.)} + \alpha_1|\sigma_{(.)}|^{2/3}\text{sign}(\sigma_{(.)}) + \alpha_2\int|\sigma_{(.)}|^{1/3}\text{sign}(\sigma_{(.)})d\tau = \Gamma_{\perp(.)}^T + \eta_{(.)} = g_{(.)}$$

and the controller is:

$$\begin{cases} u_{(.)} = \hat{\Gamma}_{\perp(.)}^T + \hat{\eta}_{(.)} - \alpha_1|\sigma_{(.)}|^{2/3}\text{sign}(\sigma_{(.)}) + w \\ \dot{w} = -\alpha_2|\sigma_{(.)}|^{1/3}\text{sign}(\sigma_{(.)}); \end{cases}$$

$$\hat{\Gamma}_{\perp(.)}^T = sel(\hat{\Gamma}1_{\perp(.)}^T, \hat{\Gamma}2_{\perp(.)}^T)$$

where (.)=normal(Z) or transversal(Y).

35. A system for guiding a missile to intercept a target comprising:
- an optical target sensor providing line of sight information relating to a position of said target relative to said missile;
- a target state estimator responsive to said line of sight information, said target state estimator generating target dynamic state estimates;
- an inertial measuring unit providing inertial states of said missile;
- a guidance processor, said guidance processor having a memory containing processing instructions for guiding said missile to said target based on target dynamic state estimates and said inertial states of said missile; said guidance processor generating a divert acceleration command;
- a lateral control system responsive to said divert acceleration command for controlling said missile in accordance with said divert acceleration command;
- wherein said optical target sensor includes a boresight directing process based on a high order sliding mode control having a sliding surface that maintains said position of said target within a field of view of said optical target sensor.

36. The system as recited in claim 35, wherein the optical target sensor includes a focal plane array mounted fixed in relation to a missile body reference for said missile, and a moving mirror is used to direct said field of view of said optical target sensor.

37. The system as recited in claim 36, wherein a slewing function is designed to track the seeker boresight in the direction of the target Line-Of-Sight; this is achieved by steering a moving mirror such that the center or any other point in the target image remains centered on the focal plane array in the presence of target and interception lateral motion and interceptor attitude motion; a quaternion representing the transformation from bore-sight-axes LOS to Earth Centered Inertial Intertial reference is represented by:

$$Q_{Bore}^{ECI} = \left( \int \begin{bmatrix} 0 & 0 & -\zeta & -\dot{\nu} \\ 0 & 0 & \dot{\nu} & -\zeta \\ \zeta & -\dot{\nu} & 0 & 0 \\ \dot{\nu} & \zeta & 0 & 0 \end{bmatrix} Q_{Body}^{Bore} dt \right) Q_{Bore}^{ECI}$$

where $\zeta, \nu$ are the rotations in pitch and yaw respectively.

38. The system as recited in claim 37, wherein the slewing of the boresight line is achieved using a nonlinear filter with pulse width modulation controller described by:

$$\begin{cases} \dot{\chi}_{(.)} = \xi_{(.)}|\sigma_{(.)}|^{0.5}\text{sign}(\sigma_{(.)}) - \eta_{(.)}|J_{(.)}|^{0.5}\text{sign}(J_{(.)}); \quad (.) = p, q, r \\ J_{(.)} = \chi_{(.)} + \sigma_{(.)}; \\ u_{[.]} = F_{(.)}(J_{(.)}, d_{(.)}(t)); \quad [.] = l, m, n \end{cases}$$

where $$F_{(.)}(J_{(.)}, d_{(.)}(t)) = \begin{cases} -\rho_{(.)}0 & \text{if } J + d(t) > \varepsilon \\ 0 & \text{if } |J + d(t)| \leq \varepsilon, \\ \rho_{(.)}0 & \text{if } J + d(t) < \varepsilon \end{cases}$$

where d(t) represents a dither signal, and $u_{(.)}$ are pulse width modulation torque rate commands.

39. The system as recited in claim 35, wherein the sensor includes a focal plane array mounted on a gimbaled platform and the gimbaled platform is moved to direct the field of view of the optical array.

40. The system as recited in claim 39, wherein a slewing function is designed to track the seeker boresight in the direction of the target Line-Of-Sight; this is achieved by orienting the platform such that the center or any other point in the target image remains centered on the focal plane array in the presence of target and interception lateral motion and interceptor attitude motion; a quaternion representing the transformation from bore-sight-axes LOS to an Earth Centered Intertial Inertial reference is represented by:

$$Q_{Bore}^{ECI} = \int \begin{bmatrix} 0 & 0 & -\zeta & -\upsilon \\ 0 & 0 & \upsilon & -\zeta \\ \zeta & -\upsilon & 0 & 0 \\ \upsilon & \zeta & 0 & 0 \end{bmatrix} Q_{Bore}^{ECI} dt$$

where $\zeta, \upsilon$ are the rotations in pitch and yaw respectively.

41. The system as recited in claim 35, wherein a fourth order sliding mode observer is used to estimate target relative velocity orthogonal to boresight and target acceleration orthogonal to boresight, said fourth order observer being described by:

$$\begin{cases} \hat{\varepsilon}_{(.)} = v_{0(.)}; \quad (.) = \text{pitch, yaw;} \\ \varepsilon_{(.)} = \text{normal/transversal target pos } w/r \text{ boresight} \\ v_{0(.)} = -5 \; L^{1/5} |\hat{\varepsilon}_{(.)} - \overline{\varepsilon}|^{4/5} \text{sign}(\hat{\varepsilon}_{(.)} - \overline{\varepsilon}_{(.)}) + \hat{V}_{\perp(.)} - \overline{\Omega}_{(.)}r, \\ \hat{V}_{\perp(.)} = v_{1(.)}, \\ v_{1(.)} = -3L^{1/4} |\hat{V}_{\perp(.)} - \overline{\Omega}_{(.)}r - v_{0(.)}|^{3/4} \text{sign}(\hat{V}_{\perp(.)} - \overline{\Omega}_{(.)}r - v_{0(.)}) + \hat{a}_{(.)}^T - \overline{a}_{(.)}^M, \\ \hat{a}_{(.)}^T = v_{2(.)} \\ v_{2(.)} = -2L^{1/3} |\hat{a}_{(.)}^T - \overline{a}_{(.)}^M - v_{1(.)}|^{2/3} \text{sign}(\hat{a}_{(.)}^T - \overline{a}_{(.)}^M - v_{1(.)}) + z_{3(.)} \\ \dot{z}_{3(.)} = v_{3(.)} \\ v_{3(.)} = -1.5L^{1/2} |z_{3(.)} - v_{2(.)}|^{1/2} \text{sign}(z_{3(.)} - v_{2(.)}) + z_{4(.)} \\ \dot{z}_{4(.)} = v_{4(.)}, \\ v_{4(.)} = -1.1L \text{sign}(z_{4(.)} - v_{3(.)}) \end{cases}$$

42. The system as recited in claim 41, wherein residual disturbing dynamical effects $\tilde{\Omega}_{(.)} = \Omega_{(.)} - \overline{\Omega}_{(.)}$ and a $\tilde{a}_{\perp(.)}^M = a_{\perp(.)}^M - \overline{a}_{\perp(.)}^M$ are accommodated within a disturbance bound in accordance with said Lipshitz constant L.

* * * * *